United States Patent
Lee et al.

(10) Patent No.: US 8,499,317 B2
(45) Date of Patent: Jul. 30, 2013

(54) MOBILE TERMINAL AND METHOD OF CONTROLLING A BROADCAST CONTENT DISPLAY THEREIN

(75) Inventors: Wonjong Lee, Gyeonggi-do (KR); Hyunho Koh, Seoul (KR); Miseon Kim, Seoul (KR); Euisoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 250 days.

(21) Appl. No.: 13/045,443

(22) Filed: Mar. 10, 2011

(65) Prior Publication Data
US 2012/0117589 A1 May 10, 2012

(30) Foreign Application Priority Data
Nov. 5, 2010 (KR) .................. 10-2010-0109825

(51) Int. Cl.
*H04N 7/16* (2011.01)
(52) U.S. Cl.
USPC .................. 725/28; 725/25; 725/30
(58) Field of Classification Search
USPC .................. 725/25, 28, 30
See application file for complete search history.

(56) References Cited

U.S. PATENT DOCUMENTS

| | | | | |
|---|---|---|---|---|
| 5,828,402 A * | 10/1998 | Collings | ........................ | 725/28 |
| 6,493,744 B1 * | 12/2002 | Emens et al. | ................ | 709/203 |
| 6,684,240 B1 * | 1/2004 | Goddard | ...................... | 709/217 |
| 7,697,653 B2 * | 4/2010 | Urakawa et al. | ............. | 375/377 |
| 7,975,278 B2 * | 7/2011 | Kinoshita et al. | ............... | 725/28 |
| 2005/0028191 A1 * | 2/2005 | Sullivan et al. | ................ | 725/28 |
| 2007/0074245 A1 * | 3/2007 | Nyako et al. | .................... | 725/34 |
| 2011/0321075 A1 * | 12/2011 | Brunkhorst et al. | ........... | 725/13 |

* cited by examiner

*Primary Examiner* — Pankaj Kumar
*Assistant Examiner* — Timothy Newlin
(74) *Attorney, Agent, or Firm* — Lee, Hong, Degerman, Kang & Waimey

(57) ABSTRACT

The present invention includes comparing a content rating value set on a received broadcast content to a reference rating value set on the mobile terminal, if the content rating value meets the reference rating value as a result of the comparing step, displaying the broadcast content, receiving an input of a viewing restriction command signal in the course of displaying the broadcast content, if the viewing restriction command signal is inputted, adjusting at least one of a plurality of field values configuring the reference rating value to prevent the content rating value from meeting the reference rating value, and if the content rating value fails to meet the reference rating value as a result of the adjusting step, stopping a display of the first broadcast content.

26 Claims, 34 Drawing Sheets

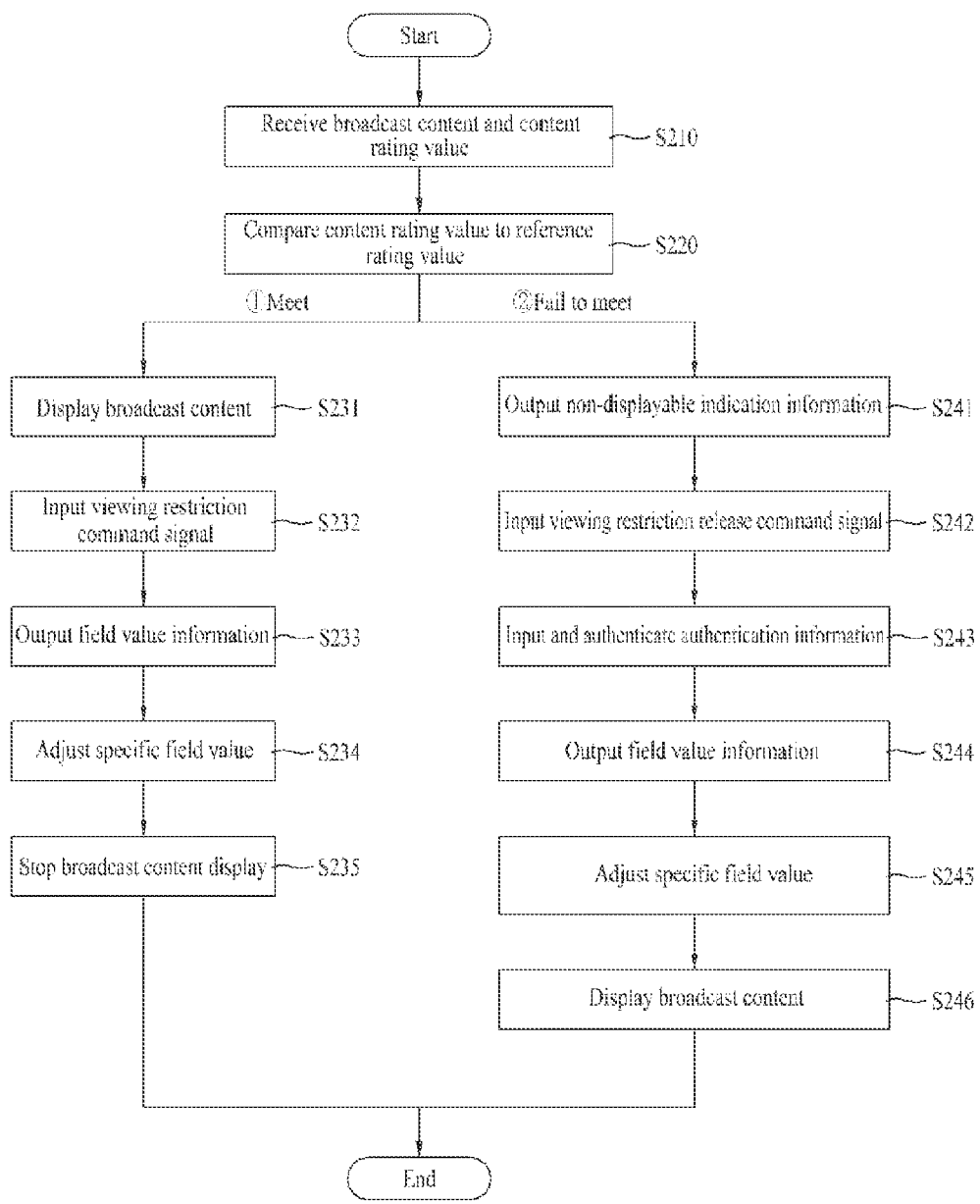

FIG. 3A

| F 0 | TV Parental Guideline Age-Based Rating for Entire Audience | 310 |
|---|---|---|
| F 1 | Dialog Flag | 320 |
| F 2 | Language Flag | 330 |
| F 3 | Sexual Content Flag | 340 |
| F 4 | Violence Flag | 350 |
| F 5 | TV Parental Guideling Age-Based Rating for Children's Programs | 360 |
| F 6 | Fantasy Violence Flag | 370 |
| F 7 | MPAA Rating | 380 |

FIG. 3B

| F0 | F1 | F2 | F3 | F4 | F5 | F6 | F7 |
|---|---|---|---|---|---|---|---|
| (0) Entire Audience grad = "1" | (1) Dialogue grad = "0" | (2) Language grad = "0" | (3) Sex grad = "0" | (4) Violence grad = "0" | (5) Children grad = "1" | (6) Fantasy Violence grad = "0" | (7) MPAA grad = "0" |
| [0] abbrev = "None" value = "" | [0] abbrev = "" value = "" | [0] abbrev = "" value = "" | [0] abbrev = "" value = "" | [0] abbrev = "" value = "" | [0] abbrev = "" value = "" | [0] abbrev = "" value = "" | [0] abbrev = "" value = "" |
| [1] abbrev = "D" value = "None" | [1] abbrev = "D" value = "D" | [1] abbrev = "L" value = "L" | [1] abbrev = "S" value = "S" | [1] abbrev = "V" value = "V" | [1] abbrev = "TV-Y" value = "TV-Y" | [1] abbrev = "FV" value = "FV" | [1] abbrev = "N/A" value = "MPAA Rating Not Applicable" |
| [2] abbrev = "TV-G" value = "TV-G" | | | | | [2] abbrev = "TV-Y7" value = "TV-Y7" | | [2] abbrev = "G" value = "Suitable for All Ages" |
| [3] abbrev = "TV-PG" value = "TV-PG" | | | | | | | [3] abbrev = "PG" value = "Parental Guidance Suggested" |
| [4] abbrev = "TV-14" value = "TV-14" | | | | | | | [4] abbrev = "PG-13" value = "Parents Strongly Cautioned" |
| [5] abbrev = "TV-MA" value = "TV-MA" | | | | | | | [5] abbrev = "R" value = "Parents Strongly Cautioned" |
| | | | | | | | [6] abbrev = "NC-17" value = "No One 17 and Under Admitted" |
| | | | | | | | [7] abbrev = "X" value = "No One 17 and Under Admitted" |
| | | | | | | | [8] abbrev = "X" value = "Not Rated by MPAA" |

FIG. 4

| Message rating_dimension | \multicolumn{8}{c}{Permitted Values of rating_value sent in Content Advisory Descriptor} |||||||||
|---|---|---|---|---|---|---|---|---|
|  | 0 | 1 | 2 | 3 | 4 | 5 | 6 | 7 |
| No Message | \multicolumn{8}{c}{DESCRIPTOR NOT PRESENT} |||||||||
| TV-None | 1 | 0 | 0 | 0 | 0 | 0 | 0 | X |
| TV-Y | 0 | 0 | 0 | 0 | 0 | 1 | 0 | X |
| TV-Y7 | 0 | 0 | 0 | 0 | 0 | 2 | 0 | X |
| TV-Y7-FV | 0 | 0 | 0 | 0 | 0 | 2 | 0 | X |
| TV-G | 2 | 0 | 0 | 0 | 0 | 0 | 0 | X |
| TV-PG | 3 | 0 | 0 | 0 | 0 | 0 | 0 | X |
| TV-PG-D | 3 | 1 | 0 | 0 | 0 | 0 | 0 | X |
| TV-PG-L | 3 | 0 | 0 | 0 | 0 | 0 | 0 | X |
| TV-PG-S | 3 | 0 | 0 | 1 | 0 | 0 | 0 | X |
| TV-PG-V | 3 | 0 | 0 | 0 | 1 | 0 | 0 | X |
| TV-PG-D-L | 2 | 1 | 1 | 0 | 0 | 0 | 0 | X |
| TV-PG-D-S | 3 | 1 | 0 | 0 | 0 | 0 | 0 | X |
| TV-PG-D-S-V | 3 | 1 | 0 | 1 | 1 | 0 | 0 | X |
| TV-PG-L-S-V | 3 | 0 | 1 | 1 | 1 | 0 | 0 | X |
| TV-PG-D-L-S-V | 3 | 1 | 1 | 1 | 1 | 0 | 0 | X |
| TV-14 | 4 | 0 | 0 | 0 | 0 | 0 | 0 | X |
| TV-14-D-L | 4 | 1 | 1 | 0 | 0 | 0 | 0 | X |
| TV-14-D-S | 4 | 1 | 0 | 1 | 0 | 0 | 0 | X |
| TV-14-D-V | 4 | 1 | 0 | 0 | 1 | 0 | 0 | X |
| TV-14-L-S | 4 | 0 | 1 | 1 | 0 | 0 | 0 | X |
| TV-14-L-V | 4 | 0 | 1 | 0 | 1 | 0 | 0 | X |
| TV-14-S-V | 4 | 0 | 0 | 1 | 1 | 0 | 0 | X |
| TV-14-D-L-S-V | 4 | 1 | 1 | 1 | 1 | 0 | 0 | X |
| TV-MA | 5 | 0 | 0 | 0 | 0 | 0 | 0 | X |
| TV-MA-L | 5 | 0 | 1 | 0 | 0 | 0 | 0 | X |
| TV-MA-S-V | 5 | 0 | 0 | 1 | 1 | 0 | 0 | X |
| TV-MA-L-S-V | 5 | 0 | 1 | 1 | 1 | 0 | 0 | X |

FIG. 5

| F 0 | F 1 | F 2 | F 3 | F 4 | F 5 | F 6 |
|---|---|---|---|---|---|---|
| (0) Entire Audience | (1) Dialogue | (2) Language | (3) Sex | (4) Violence | (5) Children | (6) Fantasy Violence |
| grad = "1" | grad = "0" | grad = "0" | grad = "0" | grad = "0" | grad = "1" | grad = "0" |
| [0] abbrev = "" value = "" | [0] abbrev = "" value = "" | [0] abbrev = "" value = "" | [0] abbrev = "" value = "" | [0] abbrev = "" value = "" | [0] abbrev = "" value = "" | [0] abbrev = "" value = "" |
| [1] abbrev = "None" value = "None" | [1] abbrev = "D1" value = "D1" | [1] abbrev = "L1" value = "L1" | [1] abbrev = "S1" value = "S1" | [1] abbrev = "V1" value = "V1" | [1] abbrev = "TV-Y" value = "TV-Y" | [1] abbrev = "FV1" value = "FV1" |
| [2] abbrev = "TV-G" value = "TV-G" | [2] abbrev = "D2" value = "D2" | [2] abbrev = "L2" value = "L2" | [2] abbrev = "S2" value = "S2" | [2] abbrev = "V2" value = "V2" | [2] abbrev = "TV-Y7" value = "TV-Y7" | [2] abbrev = "FV2" value = "FV2" |
| [3] abbrev = "TV-PG" value = "TV-PG" | [3] abbrev = "D3" value = "D3" | [3] abbrev = "L3" value = "L3" | [3] abbrev = "S3" value = "S3" | [3] abbrev = "V3" value = "V3" | | [3] abbrev = "FV3" value = "FV3" |
| [4] abbrev = "TV-14" value = "TV-14" | [4] abbrev = "D4" value = "D4" | [4] abbrev = "L4" value = "L4" | [4] abbrev = "S4" value = "S4" | [4] abbrev = "V4" value = "V4" | | [4] abbrev = "FV4" value = "FV4" |
| [5] abbrev = "TV-MA" value = "TV-MA" | [5] abbrev = "D5" value = "D5" | [5] abbrev = "L5" value = "L5" | [5] abbrev = "S5" value = "S5" | [5] abbrev = "V5" value = "V5" | | [5] abbrev = "FV5" value = "FV5" |

| Reference rating value setting | |
|---|---|
| F0: Viewing parental guidance | |
| No setting | ☐ |
| No restriction | ☐ |
| Guidance required | ☐ |
| Parental guidance required | ☐ |
| Viewing guidance required for ages 14 and under | ☑ |
| Viewing guidance required for ages except adult | ☐ |
| F1: Dialogue | |
| Set | ☑ |
| Release | ☐ |
| F2: Language | |
| Set | ☐ |
| Release | ☑ |

FIG. 7B

| Reference rating value setting | |
|---|---|
| F3: Sexual content | |
| Set | ☐ |
| Release | ☑ |
| F4: Violence | |
| Set | ☑ |
| Release | ☐ |
| F5: Parent guidance for children's program | |
| No setting | ☑ |
| All ages | ☐ |
| Ages 7 and over | ☐ |

FIG. 7C

| Reference rating value setting |   |
|---|---|
| F6: Fantasy violence | |
| Set | ☐ |
| Release | ☑ |
| F7: Independent field (MPAA) | |
| No setting | ☑ |
| Not apply | ☐ |
| Suitable for all ages | ☐ |
| Viewing parental guidance required | ☐ |
| Viewing with adults for ages 17 and under | ☐ |
| Viewing restricted for ages 17 and under limitedly | ☐ |
| Viewing restricted for ages 17 and under | ☐ |
| Viewing restricted | ☐ |

FIG. 7D

| F0 | F1 | F2 | F3 | F4 | F5 | F6 | F7 |
|---|---|---|---|---|---|---|---|
| 14 | 1 | 0 | 0 | 1 | 0 | 0 | X |

FIG. 8A

Reference rating value setting

F0: Viewing parental guidance
No setting ☐
No restriction ☐
Guidance required ☐
Parental guidance required ☐
Viewing guidance required for ages 14 and under ☑
Viewing guidance required for ages except adults ☐
F1: Dialogue
Set | 1 | 2 | 3 | 4 | 5 |
Release ☐
F2: Language
Set | 1 | 2 | 3 | 4 | 5 |
Release ☑

FIG. 8B

Reference rating value setting

F3: Sexual content
Set | 1 | 2 | 3 | 4 | 5 |
Release ☑
F4: Violence
Set | 1 | 2 | 3 | 4 | 5 |
Release ☐
F5: Parental guidance for children's program
No setting ☑
All ages ☐
Ages 7 and over ☐

| F0 | F1 | F2 | F3 | F4 | F5 | F6 |
|----|----|----|----|----|----|----|
| 14 | 3  | 0  | 0  | 3  | 0  | 0  |

FIG. 9A

| Priority setting | |
|---|---|
| F 0 | 3 |
| F 1 | 1 |
| F 2 | 4 |
| F 3 | 5 |
| F 4 | 2 |
| F 5 | 6 |
| F 6 | 7 |
| F 7 | Separate |

FIG. 9B

Field value adjustment

1. Auto adjustment  ☐
2. Manual adjustment  ☐
- Field selection  ☐
- Adjustment extent selection  ☐

FIG. 10A

|  | F0 | F1 | F2 | F3 | F4 | F5 | F6 | F7 |
|---|---|---|---|---|---|---|---|---|
| Content rating value | PG | 0 | 1 | 1 | 0 | 0 | 0 | X |
| Reference raging value | 14 | 1 | 0 | 0 | 1 | 0 | 0 | X |

(a)

|  | F0 | F1 | F2 | F3 | F4 | F5 | F6 |
|---|---|---|---|---|---|---|---|
| Content rating value | PG | 1 | 0 | 3 | 2 | 0 | 0 |
| Reference raging value | 14 | 3 | 0 | 0 | 3 | 0 | 0 |

|  | F0 | F1 | F2 | F3 | F4 | F5 | F6 | F7 |
|---|---|---|---|---|---|---|---|---|
| Content rating value | MA | 1 | 0 | 1 | 0 | 0 | 0 | X |
| Reference raging value | 14 | 1 | 0 | 0 | 1 | 0 | 0 | X |

(a)

|  | F0 | F1 | F2 | F3 | F4 | F5 | F6 |
|---|---|---|---|---|---|---|---|
| Content rating value | MA | 3 | 2 | 0 | 4 | 0 | 0 |
| Reference raging value | 14 | 3 | 0 | 0 | 3 | 0 | 0 |

(b)

FIG. 16B
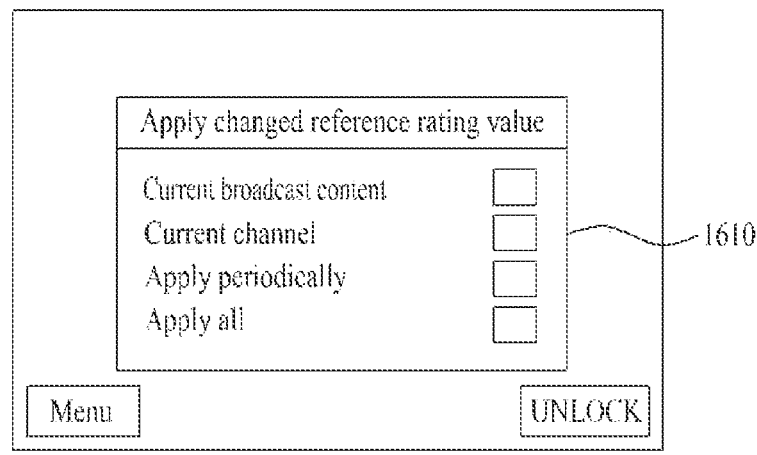
(a)
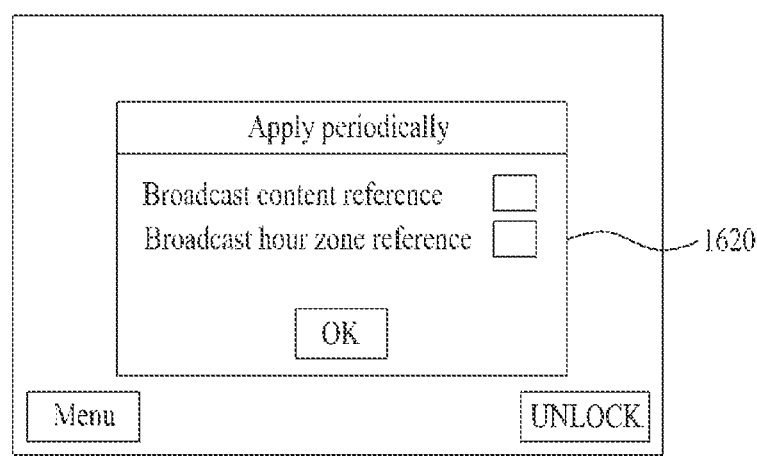
(b)

FIG. 18B
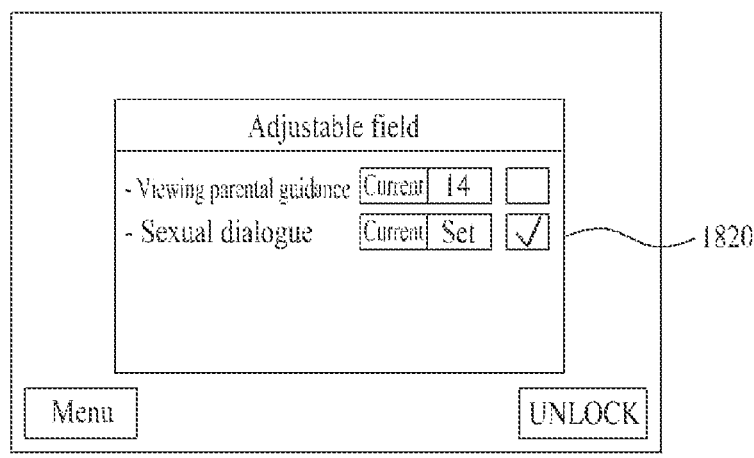
(a)
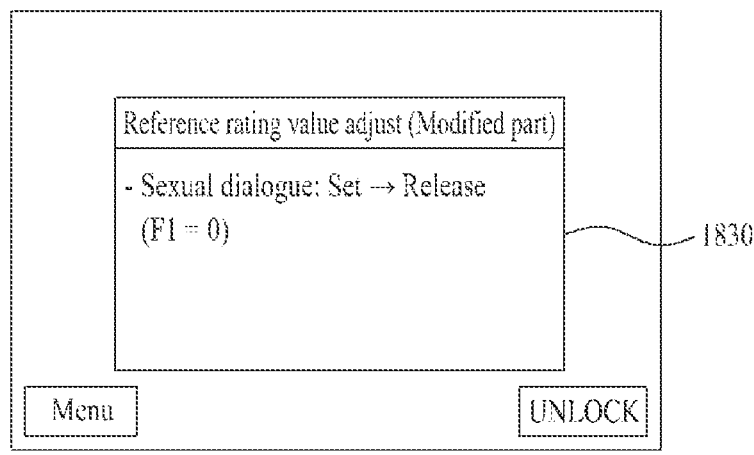
(b)

FIG. 19A
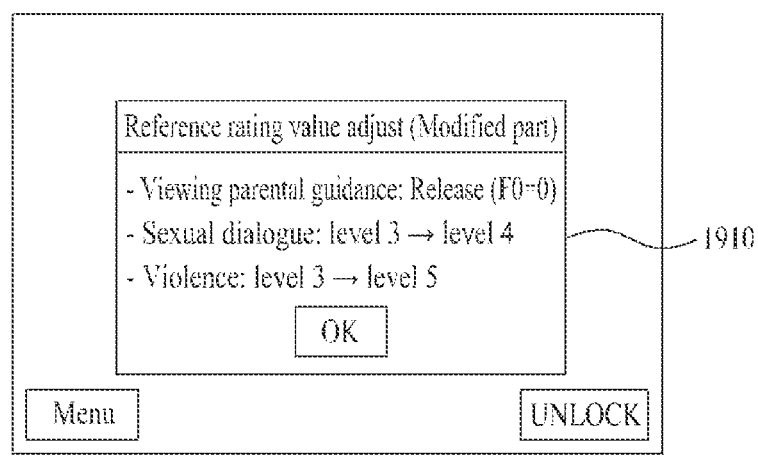
(a)
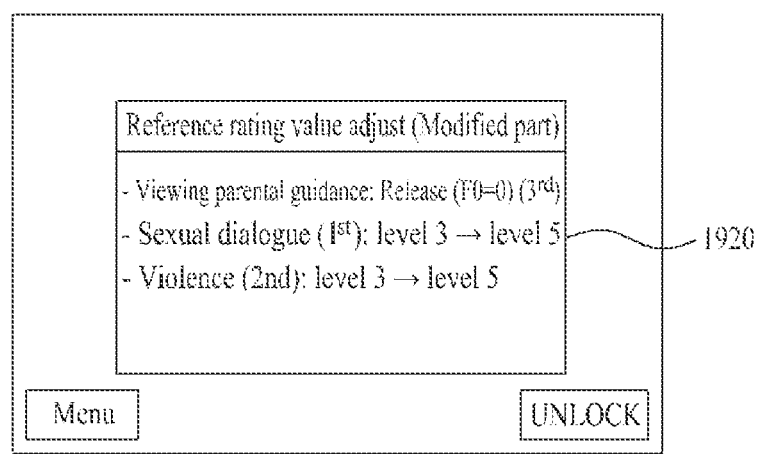
(b)

FIG. 21A

| Broadcast content list |
| :---: |
| ◁ CH 1 ▷ |

| 1st content | 09 : 00 ~ 11 : 00 |
| 2nd content | 11 : 00 ~ 12 : 00 |
| 3rd content | 12 : 00 ~ 13 : 30 |
| 4th content | 13 : 30 ~ 15 : 00 | — 2101
| 5th content | 15 : 00 ~ 17 : 00 | — 2102
| 6th content | 17 : 00 ~ 19 : 00 |

| Broadcast content list |
| :---: |
| ◁ CH 1 ▷ |

1st content    09 : 00 ~ 11 : 00

Viewing reservation ☐
Recording reservation ☐ — 2110
Viewing restriction setting ☐
Viewing restriction release setting ☐

6th content    17 : 00 ~ 19 : 00

| Broadcast content list | | |
|---|---|---|
| ◁ | CH 1 | ▷ |
| 1st content | 09 : 00 ~ 11 : 00 | |
| 2nd content | 11 : 00 ~ 12 : 00 | |
| 3rd content | 12 : 00 ~ 13 : 30 | |
| 4th content | 13 : 30 ~ 15 : 00 | L — 2121 |
| 5th content | 15 : 00 ~ 17 : 00 | UL — 2122 |
| 6th content | 17 : 00 ~ 19 : 00 | |

OK

MOBILE TERMINAL AND METHOD OF CONTROLLING A BROADCAST CONTENT DISPLAY THEREIN

CROSS-REFERENCE TO RELATED APPLICATIONS

Pursuant to 35 U.S.C. §119(a), this application claims the benefit of earlier filing date and right of priority to Korean Patent Application No. 10-2010-0109825, filed on Nov. 5, 2010, the contents of which are hereby incorporated by reference herein in their entirety.

BACKGROUND OF THE INVENTION

1. Field of the Invention

The present invention relates to a mobile terminal, and more particularly, to a mobile terminal and method of controlling a broadcast content display therein. Although the present invention is suitable for a wide scope of applications, it is particularly suitable for setting a view restriction or a view restriction release for a broadcast content.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

According to a related art, in case of receiving a broadcast content for which viewable ages are set, a mobile terminal compares a broadcast viewable age information previously set in the terminal to viewable ages that are set for the received broadcast content. As a result of the comparison, if the condition of the viewable ages is met, the mobile terminal is able to output the received broadcast content.

However, according to the above-described related art, it is unable to further consider various factors for broadcast viewing restrictions in addition to the viewable ages.

Eve if the broadcast viewing can be restricted in consideration of various factors, a restriction rating system for the various factors has not be specified yet.

SUMMARY OF THE INVENTION

Accordingly, the present invention is directed to a mobile terminal and method of controlling a broadcast content display therein that substantially obviate one or more problems due to limitations and disadvantages of the related art.

An object of the present invention is to provide a mobile terminal and method of controlling a broadcast content display therein, by which a restriction level for each restriction factor can be efficiently set to control a viewing restriction on a broadcast content.

Another object of the present invention is to provide a mobile terminal and method of controlling a broadcast content display therein, by which a reference rating value can be adjusted in various ways to control a viewing restriction on a broadcast content in a manner that a content rating value of a broadcast content is compared to a reference rating value set for a terminal Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a wireless communication unit configured to receiving a broadcast content and a content rating value set on the broadcast content, a memory configured to store a reference rating value for controlling a viewing restriction on the broadcast content, a display module configured to display the broadcast content, a user input unit configured to receive an input of a viewing restriction command signal in the course of displaying the broadcast content, and a controller comparing the received content rating value to the store reference raging value, the controller, if the content rating value meets the reference rating value as a result of the comparison, controlling the display module to display the received broadcast content, the controller, if receiving the viewing restriction command signal, controlling at least one of a plurality of field values configuring the reference rating value to prevent the content rating value from meeting the reference rating value.

In another aspect of the present invention, a mobile terminal includes a wireless communication unit configured to receive a broadcast content, a display module configured to display a broadcast content list including a plurality of broadcast contents, a user input unit configured to receive an input of a viewing restriction command signal for a first broadcast content among a plurality of the broadcast contents, and a controller, if receiving the first broadcast content, comparing a content rating value set on the first broadcast content to a reference rating value set on the mobile terminal, the controller, if the content rating value meets the reference rating value as a result of the comparison, adjusting at least one of a plurality of field values configuring the reference rating value to prevent the content rating value from meeting the reference rating value. Particularly, if the content rating value fails to meet the reference rating value as a result of the adjustment, the display module reserves a display of the first broadcast content under the control of the controller.

In another aspect of the present invention, a method of controlling a broadcast content display in a mobile terminal includes the steps of comparing a content rating value set on a received broadcast content to a reference rating value set on the mobile terminal, if the content rating value meets the reference rating value as a result of the comparing step, displaying the broadcast content, receiving an input of a viewing restriction command signal in the course of displaying the broadcast content, if the viewing restriction command signal is inputted, adjusting at least one of a plurality of field values configuring the reference rating value to prevent the content rating value from meeting the reference rating value, and if the content rating value fails to meet the reference rating value as a result of the adjusting step, stopping a display of the first broadcast content.

In further aspect of the present invention, a method of controlling a broadcast content display in a mobile terminal includes the steps of displaying a broadcast content list including a plurality of broadcast contents, receiving an input of a viewing restriction command signal for a first broadcast content among a plurality of the broadcast contents, if receiving the first broadcast content, comparing a content rating value set on the first broadcast content to a reference rating value set on the mobile terminal, if the content rating value meets the reference rating value as a result of the comparing step, adjusting at least one of a plurality of field values configuring the reference rating value to prevent the content rating value from meeting the reference rating value, and if the content rating value fails to meet the reference rating value as a result of the adjusting step, reserving a display of the first broadcast content.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 2 is a first flowchart for a method of controlling a broadcast content display in a mobile terminal according to one embodiment of the present invention;

FIGS. 3A to 5 are diagrams for configurations of content rating values according to the present invention;

FIGS. 6 to 9B are diagrams for setting a reference rating value according to the present invention;

FIG. 10A and FIG. 10B are diagrams for comparing a content rating value to a reference rating value according to the present invention;

FIG. 16A and FIG. 16B are diagrams of screen configurations for a case that a viewing restriction is set according to the present invention;

FIG. 18A and FIG. 18B are diagrams of screen configurations for adjusting a reference rating value configured according to a first embodiment of the present invention in case of receiving an input of a viewing restriction release command signal;

FIG. 19A and FIG. 19B are diagrams of screen configurations for automatically adjusting a reference rating value configured according to a second embodiment of the present invention in case of receiving an input of a viewing restriction release command signal;

FIGS. 21A to 21C are diagrams of screen configurations for setting a viewing restriction or a viewing restriction release for a broadcast content using a broadcast content list according to the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
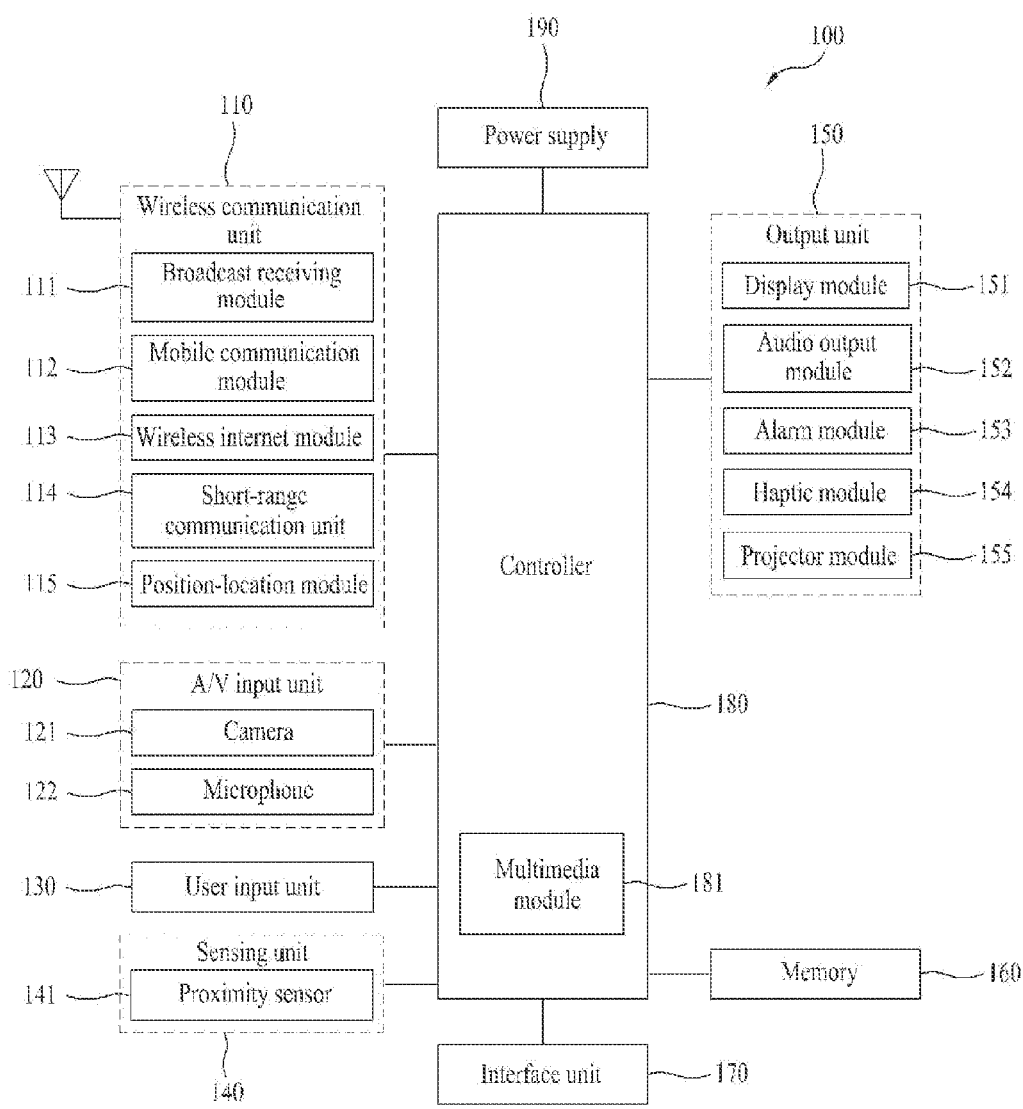
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display module 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display module 151, an audio output module 152, an alarm module 153, a haptic module 154, a projector module 155 and the like.

The display module 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display module 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display module 151 can be implemented in the optical transmittive type as well. In this configuration, a user is able to see an object in rear of a terminal body via the area occupied by the display module 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display module 151 and a sensor for detecting a touch action (hereinafter called 'touch sensor') configures a mutual layer structure (hereinafter called 'touchscreen'), it is able to use the display module 151 as an input device as well as an output device. In this case, the touch sensor can be configured as a touch film, a touch sheet, a touchpad or the like.

The touch sensor can be configured to convert a pressure applied to a specific portion of the display module 151 or a variation of a capacitance generated from a specific portion of the display module 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display module 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm module 153 is output a signal for announcing the occurrence of a particular event associated with the mobile terminal 100. Typical events include a call received event, a message received event and a touch input received event. The alarm module 153 is able to output a signal for announcing the event occurrence by way of vibration as well as video or audio signal. The video or audio signal can be outputted via the display module 151 or the audio output unit 152. Hence, the display module 151 or the audio output module 152 can be regarded as a part of the alarm module 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display module 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Meanwhile, a mobile terminal mentioned in this disclosure can include at least one of the components show in FIG. 1.

And, a broadcast content or a broadcast content mentioned in this disclosure can include a content provided to a broadcast receiving terminal (e.g., a mobile terminal 100, etc.) via at least one broadcast service (or a broadcast channel) operated by at least one broadcast provider (or a broadcast service provider).

In the following description, a method of displaying a broadcast content according to the present invention is explained with reference to the accompanying drawings.

In the first place, a method of controlling a broadcast content display in the course of receiving the broadcast content is described with reference to FIGS. 2 to 19B as follows.

FIG. 2 is a first flowchart for a method of controlling a broadcast content display in a mobile terminal according to one embodiment of the present invention.

Referring to FIG. 2, the mobile terminal 100 receives a broadcast content and a content rating value set for the broadcast content using the wireless communication unit 110 [S210].

For instance, in case that a table including a plurality of broadcast services and broadcast service configuration information is included in a specific ensemble, a broadcast content is provided via a specific one of a plurality of the broadcast services and a content rating value can be provided via a specific broadcast service providing broadcast guide information among a plurality of the broadcast services or a table providing the broadcast guide information.

In particular, according to ATSC-MH, a content rating value can be provided to a terminal in a manner of being included in a table (e.g., SMT, etc.) providing broadcast service access information and the like in an ensemble in which a broadcast service for providing a broadcast content currently received by the terminal is included. In doing so, the mobile terminal 100 is able to receive a content rating value for the currently received broadcast content only.

In this case, the content rating value is the value that is set in consideration of properties (e.g., violence, sexual words, sexual dialogue, viewable ages, etc.) of the corresponding broadcast content and is usable to restrict a viewing authority of the corresponding broadcast content.

The content rating value can be constructed with a plurality of field values. A field corresponding to each of a plurality of the field values defines a different restriction factor. And, a restriction level of the corresponding restriction factor can be set different according to the corresponding field value.

In the receiving step S210, the mobile terminal 100 receives the corresponding content rating value periodically or a random timing point in the course of receiving the broadcast content or is able to receive the content rating value via another broadcast service (i.e., the broadcast service for providing broadcast guide information) separately from the broadcast content reception.

In the following description, a configuration of a content rating value is explained with reference to FIGS. 3A to 5. FIGS. 3A to 5 are diagrams for configurations of content rating values according to the present invention.

In particular, the configurations of content rating values shown in FIGS. 3A to 4B follow the configurations proposed by ATSC-M/H. Alternatively, the content rating values can be configured in various ways. Therefore, the configurations shown in FIGS. 3A to 5 can be referred to as one embodiment.

FIG. 3A shows restriction factors defined in a plurality of fields corresponding to a plurality of field values configuring a content rating value, respectively. For clarity of the following description, assume that the number of fields is 8.

Referring to FIG. 8A, according to ATSC-MH, configuration information on at least one broadcast service included in an ensemble can be provided via a service signaling channel table (SSC-Table). In the SSC-Table, such a table as GAT, SMT, SLT, CIT and the like can be included. In particular, a content rating value can be defined in a content advisory descriptor included in the SMT (service map table).

A first field F0 310 is a field having a restriction factor set to a viewing parental guideline age-based rating for entire audience. A second field F1 320 is a field having a restriction factor set to a dialog. A third field F2 330 is a filed having a restriction factor set to a language. And, a fourth field F3 340 is a field having a restriction factor set to a sexual content (e.g., sexual dialog).

A fifth field F4 350 is a field having a restriction factor set to a violence. A sixth field F5 360 is a field having a restriction factor set to a viewing parental guideline age-based rating for children's programs. A seventh field F6 370 is a filed having a restriction factor set to a fantasy violence. And, an eighth field F7 380 is a field settable independent from the first to seventh fields 310 to 370.

FIG. 3B shows a field value settable for each of a plurality of the fields shown in FIG. 3A and a restriction extent thereof. For clarity of the following description, if a field value of a specific field is set to 0, it is assumed that the corresponding field is not set to the restriction filed.

Referring to FIG. 3B, the first field 310 can be set to a field value ranging from 0 to 5. And, an extent of the viewing parental guideline can vary according to the set field value.

For instance, the field value 1 indicates 'no restriction'. The field value 2 indicates 'viewing guidance suggested'. The field value 3 indicates 'parental guidance strongly cautioned'. The field value 4 indicates 'parental guidance strongly cautioned for ages 14 and under'. And, the field value 5 indicates 'parental guidance strongly cautioned for all ages except adults (e.g., ages 18 and over)'.

The second field 320 can be set to 0 or 1. If the second field 320 is set to 1, it is able to indicate that sexual dialogues (or dialogues implicating sexual situation) is included. The third field 330 can be set to 0 or 1. If the third field 330 is set to 1, it is able to indicate that sexual language is included.

The fourth field 340 can be set to 0 or 1. If the fourth field 340 is set to 1, it is able to indicate that sexual situation (or sexual material) is included. The fifth field 350 can be set to 0 or 1. If the fifth field 350 is set to 1, it is able to indicate that violence is included.

The sixth field 360 can be set to one of 0 to 2. If the sixth field 360 is set to 1, it is able to indicate that this content is suitable for all children (particularly, children 2 to 6 years old). If the sixth field 360 is set to 2, it is able to indicate that this content is suitable for children of age 7 and over.

The seventh field 370 can be set to 0 or 1. If the seventh field 370 is set to 1, it is able to indicate that fantasy violence is included.

And, the eighth field 380 can be set to a value ranging 0 to 8. The eighth field 380 is the field that can be set indispensably compatible with the first to seventh fields 310 to 370. As the eighth field 380 has nothing to do with the present invention, its details shall be omitted from the following description.

FIG. 4 is a first diagram showing a content rating value according to a field value of each f the first to seventh fields 310 to 370. In particular, FIG. 4 shows a case that each of the second to seventh fields (except the sixth field) is selectively set to either 'restriction applicable (field value=1)' or 'restriction inapplicable (field value=0)'.

For instance, regarding a content rating value, if each of the first field 310, the second field 320 and the third field 330 is set to 1 (TV-14-D-L), it is able to indicate that a corresponding broadcast content corresponds to 'viewing restricted for ages 14 and under', 'sexual dialogue included', and 'sexual language included'.

If the first field 310, the second field 320, the third field 330, the fourth field 340 and the fifth field 350 are set to 4, 1, 1, 1 and 1, respectively (TV-14-D-L-S-V), it is able to indicate that a corresponding broadcast content corresponds to 'viewing restricted for ages 14 and under', 'sexual dialogue included', 'sexual language included', 'sexual material included' and 'violence included'.

FIG. 5 is a second diagram showing a content rating value according to a field value of each of the first to seventh fields 310 to 370. In particular, FIG. 5 shows a case that a field value in each of the second to seventh fields (except the sixth field) is further incremented to raise a corresponding restriction level.

For instance, if the field value of the second field 320 is further incremented (e.g. incremented toward 5 from 1), it means that a level of the included sexual dialogue is further raised. If the field value of the third field 330 is further incremented, it means that a level of the included sexual language is further raised. If the field value of the fourth field 340 is further incremented, it means that a level of the included sexual material is further raised. If the field value of the fifth field 350 is further incremented, it means that a level of the included violence extent is further raised. If the field value of the seventh field 370 is further incremented, it means that a level of the included fantasy violence extent is further raised.

As mentioned in the foregoing description, if a broadcast service provider or a broadcast content provider adjusts a plurality of field values configuring a content rating value set for a broadcast content, it is able to indicate whether restriction factors are included in the broadcast content [cf. FIGS. 3B to 4B] or indicate the restriction levels of the restriction factors included in the broadcast content [cf. FIG. 5].

Referring now to FIG. 2, under the control of the controller 180, the mobile terminal 100 compares the received content rating value to the reference rating value previously stored in the memory 160 [S620]. In doing so, assume that the reference rating value is previously set and stored in the memory 160 of the mobile terminal 100.

In this case, the reference rating value is the value for controlling a viewing restriction of a broadcast content received by the mobile terminal 100 and can be constructed with a plurality of field values. In particular, a plurality of fields corresponding to a plurality of the field values define different restriction factors, respectively. And, a restriction level of the corresponding restriction factor can be set different according to the corresponding field value. Moreover, the reference rating value can have the same field structure (e.g., the number of fields, restriction factors per field, etc.) of the content rating value.

Regarding the setting of the reference rating value, the mobile terminal 100 is able to set a reference rating value randomly determined by the controller 18 or can set a reference rating value according to a field value inputted by a user.

In the following description, a process for setting a reference rating value is explained with reference to FIGS. 6 to 9B.

FIGS. 6 to 9B are diagrams for setting a reference rating value according to the present invention.

Figure 6:
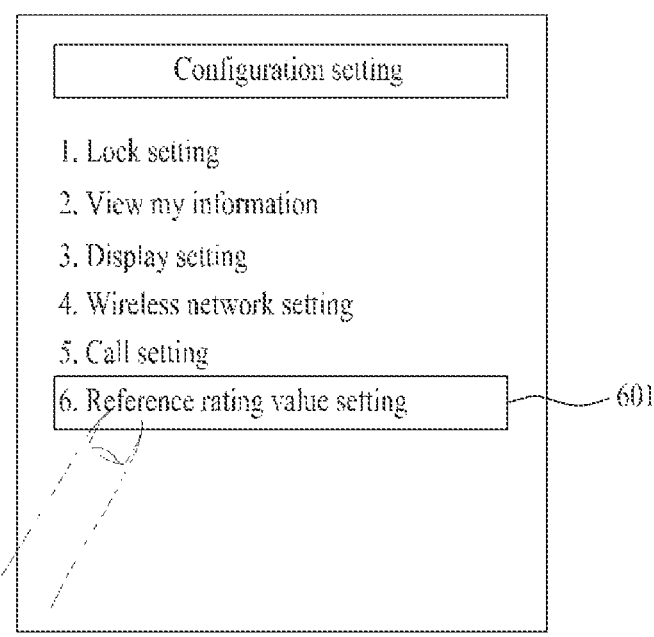

Referring to FIG. 6, the mobile terminal 100 is able to receive a selection of a menu item 601 corresponding to a reference rating value setting via a user's menu search from the user.

FIGS. 7A to 8D shows the steps of setting a plurality of field values configuring a reference rating value according to the selection of the menu item 601 in FIG. 6. For clarity of the following description, assume that a plurality of fields corresponding to a plurality of field values include the aforesaid first to seventh fields 310 to 370, respectively.

Referring to FIGS. 7A to 7C, the mobile terminal 100 enables the first to seventh fields 310 to 370 to be set to field values according to user selections, respectively.

For instance, the first field F0 is set to a field value 4 corresponding to 'viewing parental guidance suggested for ages 14 and under'. The second field F1 is set to a field value 1 corresponding to 'sexual dialogue included'. And, the fifth field F4 is set to a field value 1 corresponding to 'violence included'. The rest of the fields except the first, second and fifth field are not set as restriction factors (field value=0).

FIG. 7D is a diagram showing a configuration of the reference rating value. In particular, FIG. 7D shows the reference rating value if the first field F0, the second field F1 and the fifth field F4 are set to field values 4, 1 and 1, respectively.

Therefore, the mobile terminal 100 is able to restrict a viewing of the broadcast content for which the content rating value including the field value (F0=4 or 5) having a restriction level equal to or greater than that of 'viewing parental guidance suggested for ages 14 and under' and the field values (F1=1) corresponding to 'sexual dialogue included' or the field values (F4=1) corresponding to 'violence included'.

Figures 8C, 8D:
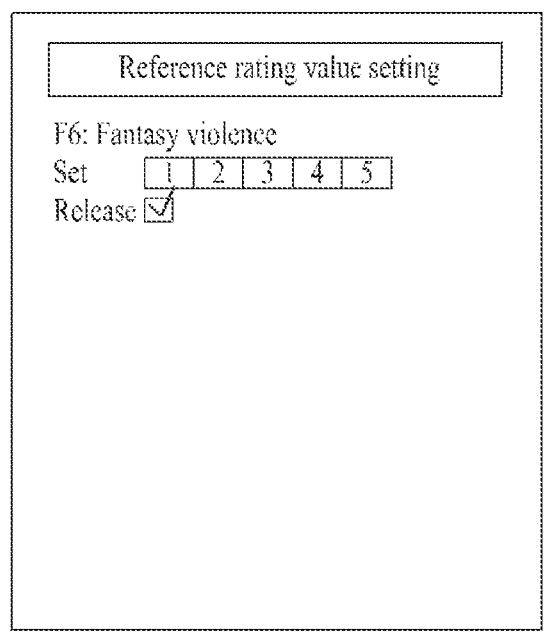

Referring to FIGS. 8A to 8C, the mobile terminal 100 enables the first to seventh fields 310 to 370 to be set to field values according to user selections, respectively.

For instance, the first field F0 is set to a field value 4 corresponding to 'viewing parental guidance suggested for ages 14 and under'. The second field F1 is set to a field value 3 corresponding to a level 3 of a sexual dialogue included extent. And, the fifth field F4 can be set to a field value 3 corresponding to a level 3 of a violence included extent. Yet, the rest of the fields except the first, second and fifth field are not set as the restriction factors (field value=0), respectively.

FIG. 8D is a diagram showing a configuration of a reference rating value. In particular, FIG. 8D shows a reference rating value if the first field F0, the second field F1 and the fifth field F4 are set to 4, 3 and 3 in FIGS. 8A to 8C, respectively.

Hence, the mobile terminal 100 is able to put restriction on a viewing of a broadcast content for which a specific content rating value is set. In this case, the specific content rating value includes the field value (F0=4 or 5) having a restriction level equal to or higher than 'viewing parental guidance suggested for ages 14 and under', the field value (F1=3 or greater) having the sexual dialogue included extent equal to or higher than the level 3 or the field value (F4=3 or greater) having the violence included extent equal to or higher than the level 3.

FIG. 9A and FIG. 9B show an additional reference rating value setting process according to the present invention.

Referring to FIG. 9A, the mobile terminal 100 is able to priorities of a plurality of fields corresponding to a plurality of field values configuring a reference rating value, respectively. Hence, if a plurality of the field values configuring the reference rating value need to be adjusted, the mobile terminal 100 is able to adjust the field values in order of higher or lower priorities, which will be described later).

Referring to FIG. 9B, in order to prepare for the case that a plurality of the field values configuring the reference rating value will need to be adjusted, the mobile terminal 100 is able to set whether to adjust the field values randomly [auto adjustment] or to adjust the field values according to a user selection [manual adjustment]. If the manual adjustment is set, the mobile terminal 100 is able to set whether to select the field(s) to adjust [field selection] and/or whether to enable a user to directly select an adjustment extent of an adjustment target field.

Referring now to FIG. 2, in the comparing step S220, the mobile terminal 100 compares a plurality of the field values configuring the content rating value to a plurality of the field values configuring the reference rating value by field unit, and more particularly, compares the field values of the fields defining the same restriction factor to each other. For instance, the first and second field of the content rating value can be compared to the first and second values of the reference rating value, respectively.

In particular, if all field values configuring the content rating value have restriction levels lower than those of the corresponding field values configuring the reference rating value, respectively, the content rating value can be regarded as meeting the reference rating value. If the content rating value meets the reference rating value, the mobile terminal 100 is able to receive and output the broadcast content having the content rating value set without viewing restriction.

On the contrary, if any one of a plurality of the field values configuring the content rating value has the restriction level equal to or higher than that of the corresponding one of the field values configuring the reference rating value, the content rating value can be regarded as failing to meet the reference rating value. Hence, if the content rating value fails to meet the reference rating value, the mobile terminal 100 is unable to receive or output the broadcast content for which the corresponding content rating value is set.

Meanwhile, regarding the field set to the field value 0 or the field value 1, if the field value of the content rating value is set to 0 or 1 and the field value of the reference rating value is set to 0, the content rating value can be regarded as meeting the reference rating value. Of each of the content rating value and the reference rating value has the field value set to 1, the content rating value can be regarded as failing to meet the reference rating value. In the field having the field value set to 0 or 1, a restriction level is not separately set but a presence or non-presence of the setting can be included as a restriction factor [field value=1 or 0].

This is described in detail with reference to FIG. 10A and FIG. 10B as follows.

FIG. 10A and FIG. 10B are diagrams for comparing a content rating value to a reference rating value according to the present invention.

In particular, FIG. 10A shows a case that a content rating value meets a reference rating value.

Referring to FIG. 10A (a), a content rating value can include PG ('viewing parental guidance strongly cautioned') of the first field F0, 1 ('sexual language included') of the third field F2 and 1 ('sexual material included') of the fourth field F3. A reference rating field includes 14 ('viewing parental guidance strongly cautioned for ages 14 and under') of the first field F0, 1 ('sexual dialogue included') of the second field F1 and 1 ('violence included') of the fifth field F4.

Regarding the configuration of the content rating value, the mobile terminal 100 determines that the first field is set to 'viewing parental guidance strongly cautioned' (F0=PG) having the restriction level lower than that of 'viewing parental guidance strongly cautioned for ages 14 and under' (F0=14). And, since the third and fourth fields not set to the reference rating value are set to the restriction factors (F2=1, F3=1), the mobile terminal 100 is able to determine that the content rating value meets the reference rating value.

Referring to FIG. 10A (b), the content rating value includes PG ('viewing parental guidance strongly cautioned') of the first field F0, 1 (sexual dialogue included extent=level 1) of the second field F1, 3 sexual material included extent=level 3) of the fourth field F3 and 2 (violence included extent level 2) of the fifth field F4. The reference rating value can include 14 ('viewing parental guidance strongly cautioned for ages 14 and under') of the first field F0, 3 (sexual dialogue included extent=level 3) of the second field F1 and 3 (violence included extent=level 3) of the fifth field F4.

Regarding the configuration of the content rating value, the first field is set to 'viewing parental guidance strongly cautioned' (F0=PG) having the restriction level lower than that of 'viewing parental guidance strongly cautioned for ages 14 and under' (F0=14). The second field is set level 1 (F1=1) having the sexual dialogue included extent lower than that of the level 3 of the reference rating value. The fourth field not set as the reference rating value is set to the restriction factor (F3=3). And, the fifth field is set to the level 2 (F4=2) having the violence included extent lower than the level 3 of the reference rating value. Therefore, the mobile terminal 100 is able to determine that the content rating value meets the reference rating value.

FIG. 10B shows a case that a content rating value does not meet a reference rating value.

Referring to FIG. 10B (a), a content rating value can include MA ('viewing parental guidance strongly cautioned for ages except adult') of the first field F0, a ('sexual dialogue included') of the second field F1 and 1 ('sexual material included') of the fourth field F3. And, a rating reference value follows the configuration shown in FIG. 10A (a).

Regarding the configuration of the content rating value, the first field is set to 'viewing parental guidance strongly cautioned for ages except adult' (F0=MA) having the restriction level higher than that of 'viewing parental guidance strongly cautioned for ages 14 and under' (F0=14). The second field is set to the level 3 (F1=3) having the same sexual dialogue included extent of the reference rating value. And, the fifth field is set to the level 4 (F4=4) having the violence included extent greater than that of the reference rating value. Therefore, the mobile terminal 100 is able to determine that the content rating value does not meet the reference rating value.

Furthermore, in case that any one of a plurality of the field values configuring the content rating value fails to meet the reference rating value in FIG. 10B, the mobile terminal 100 is able to determine that the content rating value does not meet the reference rating value.

Referring now to FIG. 2, according to the comparison result in the comparing step S220, if the content rating value meets the reference rating value [First case] or the content rating value fails to meet the reference rating value [Second case], under the control of the controller 180, the mobile terminal 100 is able to operate differently as follows.

The first case is described as follows.

First of all, if the content rating value meets the reference rating value, the mobile terminal 100 displays the received broadcast content using the display module 151 under the control of the controller 180 [S231]. In particular, the mobile terminal 100 outputs a video signal of the broadcast content using the display module 151 and is also able to output an audio signal of the broadcast content using the audio output module 152.

In this case, if the content rating value meets the reference rating value, it may mean that the mobile terminal 100 retains a viewing authority of the broadcast content for which the content rating value is set.

In the course of performing the displaying step S231, the mobile terminal 100 receives an input of a viewing restriction command signal for the displayed broadcast content via the user input unit 130 [S232].

In this case, the viewing restriction command signal can include the signal for the viewing restriction in a manner of pausing the display or output of the currently displayed broadcast content by adjusting the reference rating value to prevent the content rating value from meeting the reference rating value. For instance, the viewing restriction command signal can be regarded as a lock command signal.

Moreover, in the course of performing the displaying step S231, the mobile terminal 100 is able to display a key zone for receiving an input of the viewing restriction command signal on a prescribed region of the screen. If the displayed key zone is selected, the mobile terminal 100 is able to receive the input of the viewing restriction command signal.

In case of receiving the viewing restriction command signal [cf. S232], the mobile terminal 100 outputs information on a plurality of the field values configuring the content rating value and information of a plurality of the field values configuring the reference rating value under the control of the controller 180 [S233]. In doing so, the information on the field values can be displayed using the display module 151.

In this case, the information on a plurality of the field values configuring the content or reference rating value can include what is the restriction factor indicated by each of a plurality of the field values or can include a prescribed extent of the restriction level of the corresponding restriction factor.

Therefore, the user checks the outputted information and is then able to determine which one of the field values of the reference rating value should be adjusted to set the viewing restriction on the currently displayed broadcast content or how much of the adjustment extent should be adjusted in the adjustment target field.

Moreover, the outputting step S233 can be performed anytime if receiving a request for information output from the user despite not receiving the viewing restriction command signal. Since the output step S233 is optional for the embodiment of the present invention, it can be skipped occasionally.

In the following description, the inputting step S232 and the outputting step S233 are described with reference to FIGS. 11A to 11D.

FIGS. 11A to 11D are diagrams for screen configurations in case of receiving an input of a viewing restriction command signal according to the present invention.

Figure 11A:
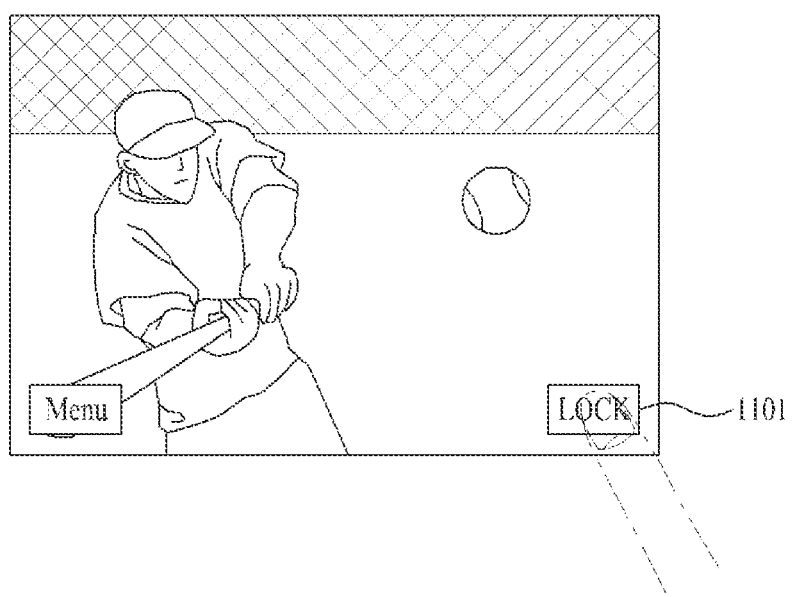
FIGS. 11A to 11D are diagrams for screen configurations in case of receiving an input of a viewing restriction command signal according to the present invention.

Referring to FIG. 11A, the mobile terminal 100 displays a key zone (LOCK) 1101 for receiving an input of a viewing restriction command signal on a prescribed region of a broadcast output screen. If the key zone 1101 is touched by a user, the mobile terminal 100 is able to receive the viewing restriction command signal.

Moreover, it is able to input the viewing restriction command signal in various ways including a selection of a corresponding menu item, a selection of a corresponding key, a detection of a corresponding motion (e.g., shaking, etc.), an input of a corresponding speech and the like.

Figure 11B:
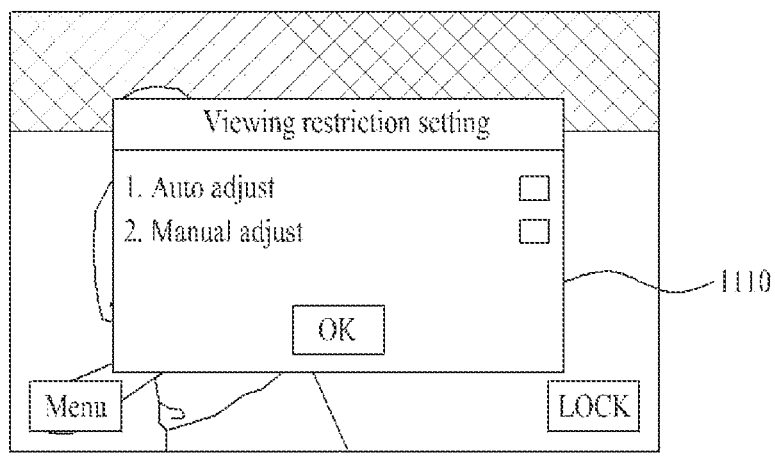

Referring to FIG. 11B, in case of receiving an input of a viewing restriction command signal, the mobile terminal 100 is able to display a window 1110 for enabling a user to select whether to adjust a reference rating value manually or automatically on a screen. In this case, the auto adjustment means that a reference rating value is randomly adjusted by the terminal. And, the manual adjustment can mean that an adjustment target field is selected by a user selection or an adjustment extent of the adjustment target field is selected by a user selection [cf. FIG. 9B].

Of course, if the auto adjustment or the manual adjustment is already determined in the previous step [cf. FIG. 9B], the step corresponding to FIG. 11B can be skipped.

Figure 11C:
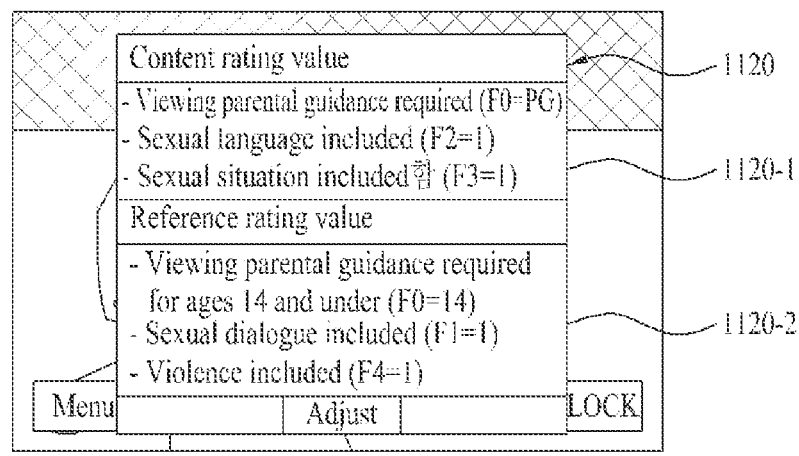
Figure 11D:
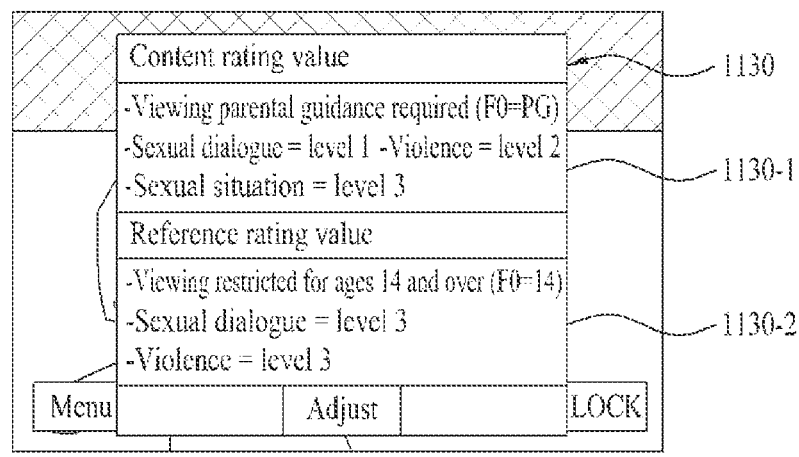

Referring to FIG. 11C and FIG. 11D, in case of receiving an input of a viewing restriction command signal, the mobile terminal 100 is able to display a window 1120 including an information 1120-1 on a plurality of field values configuring a content rating value and an information 1120-2 on a plurality of field values configuring a reference rating value or a window 1130 including an information 1130-1 on a plurality of field values configuring a content rating value and an information 1130-2 on a plurality of field values configuring a reference rating value.

In this case, the information on the content rating value and the information on the reference rating value in FIG. 11C follow the field value configuration shown in FIG. 10A (a). And, the information on the content rating value and the information on the reference rating value in FIG. 11D follow the field value configuration shown in FIG. 10A (b).

Referring now to FIG. 2, in case of receiving the input of the viewing restriction command signal [cf. S232], under the control of the controller 180, the mobile terminal 100 adjusts a specific one of a plurality of the field values configuring the reference rating value using the information outputted in the outputting step S233 to prevent the content rating value from meeting the reference rating value [S234]. In this case, the specific field value can include at least one of a plurality of the field values configuring the reference rating value.

Moreover, in order to prevent the content rating value from meeting the reference rating value to the minimum [hereinafter named a minimum impossible condition], the controller 180 minimizes the number of adjustment target fields, minimizes an adjustment extent of the adjustment target field, or is able to set a specific field value corresponding to the content rating value to have a restriction level equal to or lower than that of a corresponding field value of the content rating value only.

In case of the auto adjustment, if there is at least one field, of which value has a restriction level higher than that of the content rating value in the adjusting step S234, the mobile terminal 100 is able to adjust the corresponding field value to have the restriction level set equal to or lower by one level than that of the content rating value for all or specific one of the at least one or more fields. In this case, the specific field can be the field having the highest priority among the at least one or more field having high restriction levels.

In case of the manual adjustment, if there is at least one field, of which value has a restriction level higher than that of the content rating value in the adjusting step S234, the mobile terminal 100 is able to adjust the corresponding field value to have the restriction level set equal to or lower by one level than that of the content rating value for the specific field selected from the at least one or more fields by the user or is able to adjust the field value to have the restriction level corresponding to the adjustment extent inputted by the user for the selected specific field.

Prior to the adjusting step S234, the mobile terminal 100 is able to display an information on a field-value adjustable field (e.g., a field set to a field value having a restriction level higher than that of the content rating value) adjustable to meet the minimum output impossible condition and an information on an adjustment extent of the adjustable field. This is to facilitate the user to select an adjustment target field and an adjustment extent of the adjustment target field.

In the following description, the adjusting step S234 is explained in detail with reference to FIGS. 12A to 15C. In the following description, a filed corresponding to a reference rating field is written as a field (reference), while a field corresponding to a content rating value corresponding to a content rating value is written as a field (content).

FIGS. 12A to 13B are diagrams of screen configurations of a process for adjusting a reference rating value configured according to a first embodiment of the present invention in case of receiving an input of a viewing restriction command signal.

For clarity of the following description, assume that a content rating value and a reference rating value include the former field values shown in FIG. 10A (a).

In this case, the configuration of the reference rating value according to the first embodiment can indicate that each of the second to seventh fields (except the sixth field) is set to the field value of 1 or 0 indicating whether the corresponding field is set as a restriction factor.

Figure 12A:
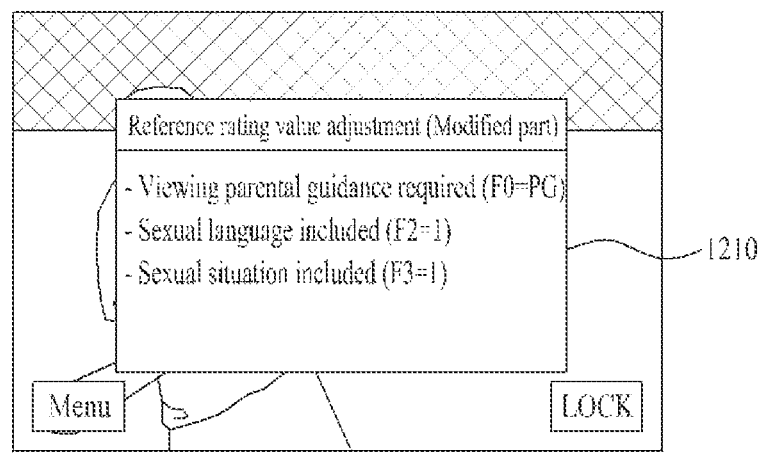
FIGS. 12A to 13B are diagrams of screen configurations for adjusting a reference rating value configured according to a first embodiment of the present invention in case of receiving an input of a viewing restriction command signal.

Referring to FIG. 12A, under the control of the controller 180, the mobile terminal 100 adjusts a field value of the first field (reference) to have a restriction level equal to or lower than PG ('viewing parental guidance suggested') of the field value of the first field (content) and is able to adjust a field value 0 of each of the third field (reference) and the fourth field (reference) to be equal to a field value 1 of each of the third field (content) and the fourth field (content). Hence, the field value of the first field (reference) is adjusted into PG from 14. The field value of the third field (reference) is adjusted into 1 from 0. And, the field value of the fourth field (reference) is adjusted into 1 from 0. Thus, the reference rating value can be adjusted not to meet the content rating value.

As an information on the adjusted field value among a plurality of the field values included in the reference rating value, the mobile terminal 100 is able to output an information 1210 indicating the adjustment of the field value having a specific restriction factor.

Figure 12B:
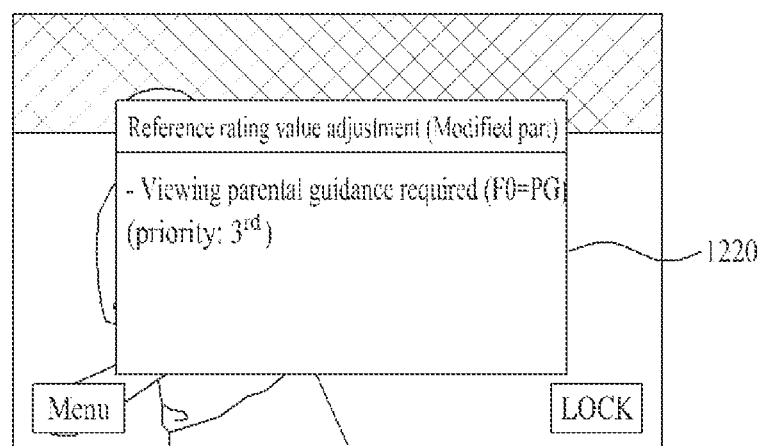

Referring to FIG. 12B, under the control of the controller 180, the mobile terminal 100 is able to only adjust a field value of a specific one of fields (i.e., the first field, the third field and the fourth field), of which field values are adjustable to meet the minimum output impossible condition, to become lower than or equal to a restriction level of the specific field (content).

For instance, the specific field can include the first field having the highest priority among the first, third and fourth fields [cf. FIG. 9A]. Therefore, as the field value of the first field (reference) is adjusted into PG from 14, the reference rating value can be adjusted not to meet the content rating value.

And, the mobile terminal 100 is able to output an information 1220 indicating how the field value is changed to have a prescribed restriction factor for the specific field.

Figure 13A:
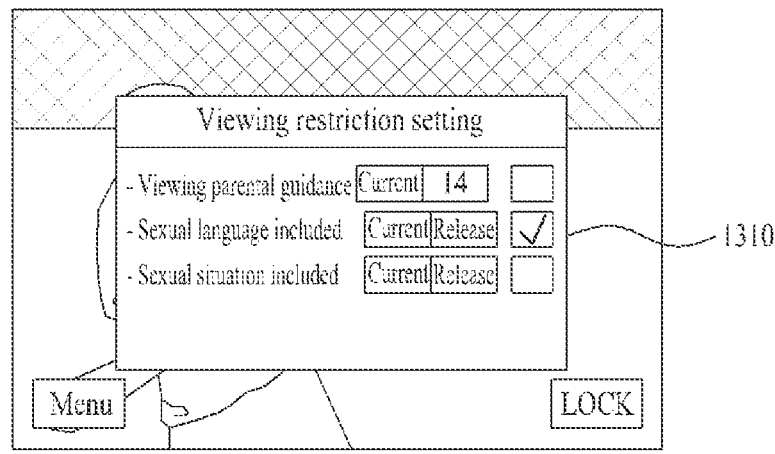

Referring to FIG. 13A, as an information 1310 on fields (i.e., the first field, the third field and the fourth field), of which field values are adjustable to meet the minimum output impossible condition, the mobile terminal 100 is able to display restriction factors per field and currently set field values (or restriction levels indicated by the currently set field values).

Therefore, a user is able to select a field to adjust a corresponding field value from the adjustable fields shown in FIG. 13A.

Figure 13B:
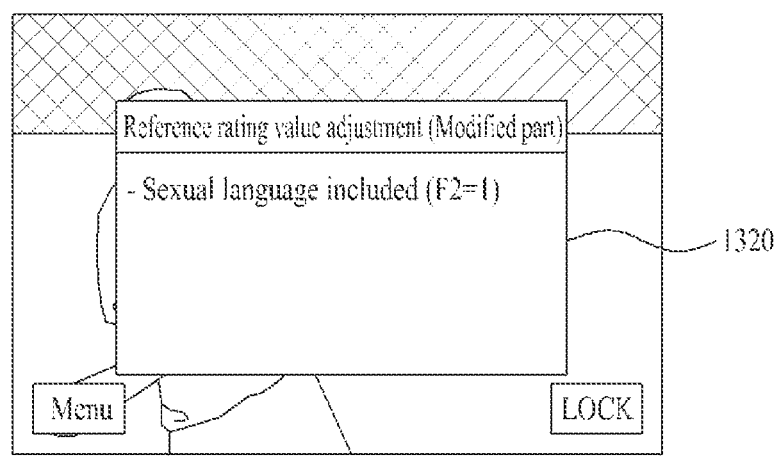

Referring to FIG. 13B, if the third field F2 having the restriction factor set to 'sexual language included' is selected by a user in FIG. 13A, the mobile terminal 100 is able to adjust the field value of the third field (reference) into 1 from 0. Hence, as the field value of the third field (reference) is adjusted into 1 from 0, the reference rating value can be adjusted not to meet the content rating value.

FIGS. 14A to 15C are diagrams of screen configurations for automatically adjusting a reference rating value configured according to a second embodiment of the present invention in case of receiving an input of a viewing restriction command signal. For clarity of the following description, assume that a content rating value and a reference rating value include the former field values shown in FIG. 10A (b).

In this case, the configuration of the reference rating value according to the second embodiment can indicate that each of the second to seventh fields (except the sixth field) is set to the field value of 1 or 0 as a restriction level of a restriction factor. In particular, the higher a level gets, the higher a restriction level becomes.

Figure 14A:
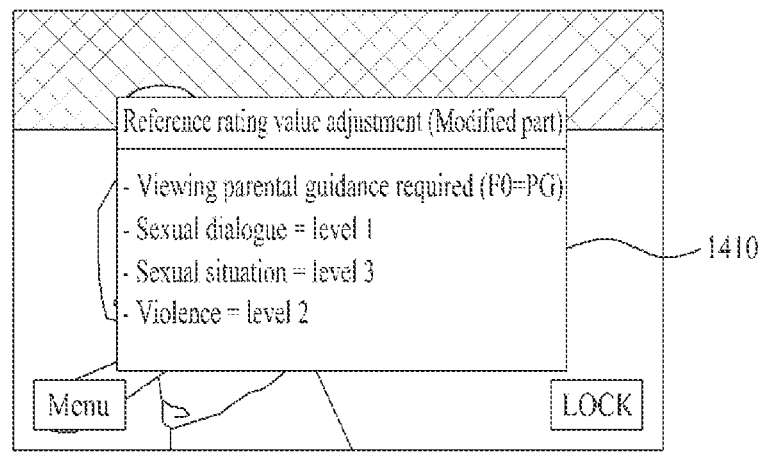
FIGS. 14A to 15C are diagrams of screen configurations for automatically adjusting a reference rating value configured according to a second embodiment of the present invention in case of receiving an input of a viewing restriction command signal.

Referring to FIG. 14A, under the control of the controller 180, the mobile terminal 100 adjusts a field value of the first field (reference) to have a restriction level equal to or lower than PG ('viewing parental guidance suggested') that is a field value of the first field (content). The mobile terminal adjusts the level 3 of the second field (reference) to become equal to the level 1 of the second field (content) [since the level 1 is the lowest restriction level, it is impossible to set a level lower than the level 1]. The mobile terminal 100 adjusts 0 of the fourth field (reference) to become equal to or lower than the level 3 of the fourth field (content). And, the mobile terminal 100 adjusts the level 3 of the fifth field (reference) to be equal to or lower than the level 2 of the fifth field (content). Hence, the reference rating value can be adjusted not to meet the content rating value.

As the information on the adjusted field value among a plurality of the field values included in the reference rating value, the mobile terminal 100 is able to output an information 1410 indicating what kind of restriction level the adjusted field value has or what kind of restriction information the adjusted restriction level has.

Figure 14B:
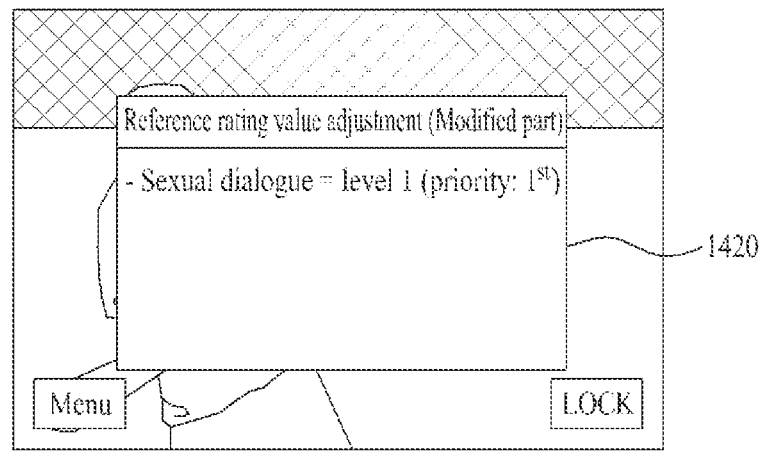

Referring to FIG. 14B, under the control of the controller 180, the mobile terminal 180 is able to only adjust a restriction level of a specific one of the fields (i.e., first, second, fourth and fifth fields), which have adjustable field values to meet the minimum output impossible condition, respectively, to become equal to or lower than the restriction level of the specific field (content).

For instance, the specific field can include the second field having the highest priority among the first, second, fourth and fifth fields [cf. FIG. 9A]. As the field value of the second field (reference) is adjusted into the level 1 from the level 3, the reference rating value can be adjusted not to meet the content rating value.

Figure 15A:
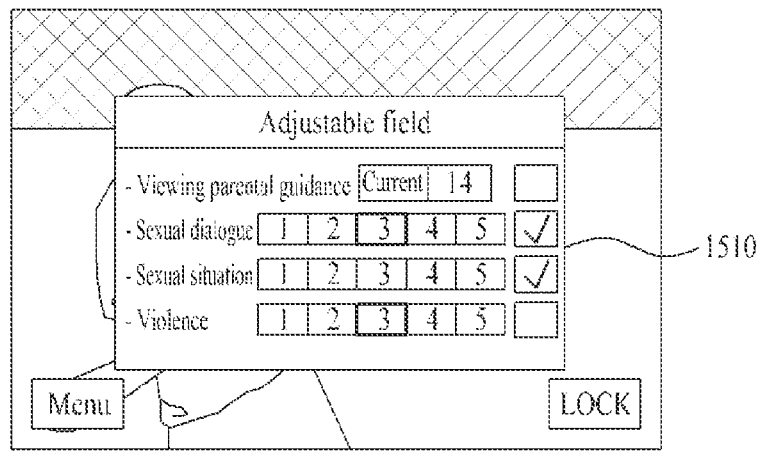

Referring to FIG. 15A, as an information 1510 on the fields (i.e., the first, second, fourth and fifth fields) having field values adjustable to meet the minimum output impossible condition, the mobile terminal is able to display restriction factors per field and currently set restriction levels. Therefore, a user is able to select a specific one of the adjustable fields shown in FIG. 15A to adjust a field value of the selected specific field.

Figure 15B:
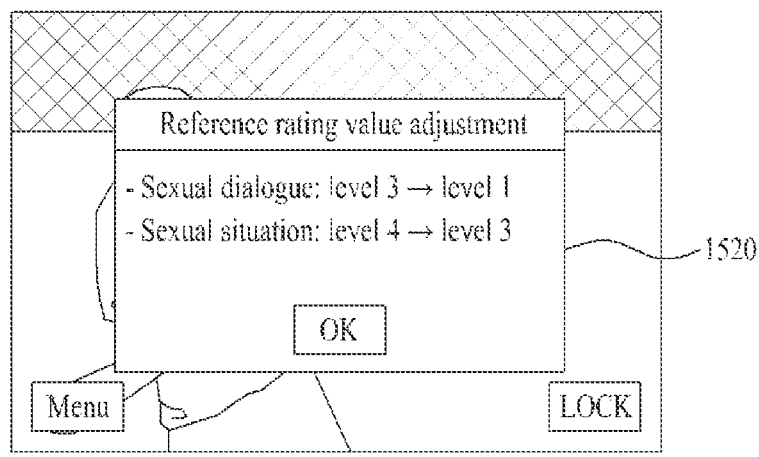

Referring to FIG. 15B, if the second field F1 having a restriction factor set to 'sexual dialogue included' and the fourth field F3 having a restriction factor set to 'sexual situation (or factor)' are selected by a user in FIG. 15A, the mobile terminal 100 adjusts the level 3 of the second field (reference) into the level 1 equal to that of the second field (content) and is also able to adjust 'no setting (F3=0)' of the fourth field (reference) into the level 3 (or lower) equal to that of the fourth field (content).

Figure 15C:
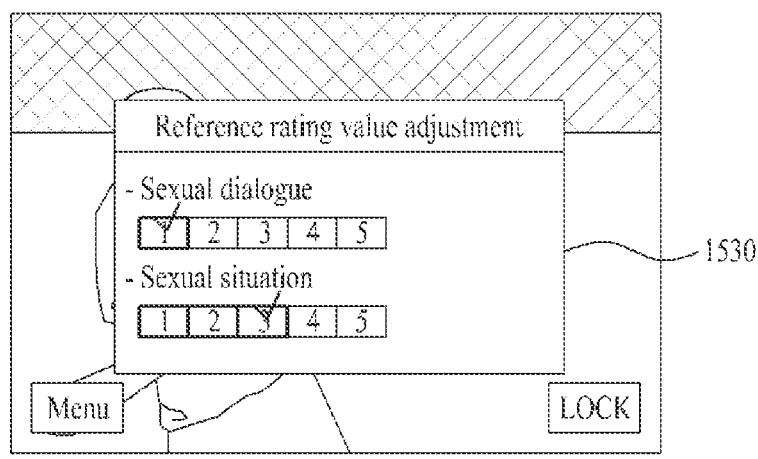

Referring to FIG. 15C, if the second field and the fourth field are selected in FIG. 15A, the mobile terminal 100 identifiably displays the level 1 [i.e., the level having a restriction level equal to or lower than that of the second field (content)] settable for the second field (restriction factor—'sexual dialogue included') and is also able to identifiably display level 1 to level 4 [i.e., the level having a restriction level equal to or lower than that of the fourth field (content)] settable for the fourth field (restriction factor—'sexual situation included'). If a user selects the level 1 and the level 3 for the second field and the fourth field, respectively, the mobile terminal 100 is able to adjust field values of the second and fourth fields into the level 1 and the level 3, respectively (cf. FIG. 15B).

Referring to FIG. 15B or FIG. 15C, as the specific field value included in the reference rating value is adjusted, the content rating value is unable to meet the reference rating value.

Referring now to FIG. 2, if the specific field value in the reference rating value is adjusted to prevent the content rating value from meeting the reference rating value in the adjusting step S234, the mobile terminal 100 puts a viewing restriction on the broadcast content displayed in the displaying step S231 and then stops displaying the corresponding broadcast content, under the control of the controller 180 [S235].

Moreover, the mobile terminal 100 is able to apply the reference rating value, of which specific field value is adjusted in the adjusting step S234, to the display-stopped broadcast content only under the control of the controller 180.

In particular, as a current broadcast service is switched to a different broadcast service or a broadcast content is changed due to broadcast organization in a broadcast service maintained state, if another broadcast content different from the output-stopped broadcast content is received, the controller 180 enables the specific field value to the former state prior to the adjustment. Yet, if the return is performed within a predetermined period of time after the switching to the different broadcast service, it is able to maintain the specific field value adjusted state.

In the following description, the viewing restriction setting is explained in detail with reference to FIG. 16A and FIG. 16B.

Figure 16A:
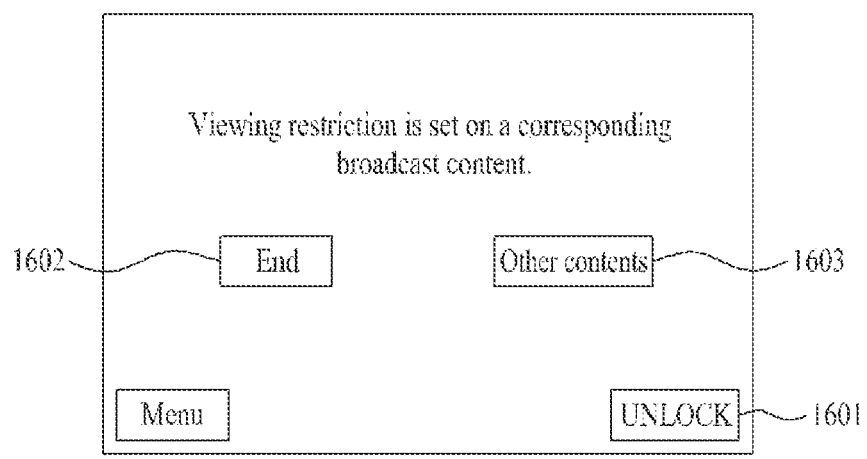

FIG. 16A and FIG. 16B are diagrams of screen configurations for a case that a viewing restriction is set according to the present invention.

Referring to FIG. 16A, if a viewing restriction is set on a displayed broadcast content, the mobile terminal 100 stops the broadcast content display and is then able to output indication information indicating that the viewing restriction has set on the corresponding broadcast content. For instance, the indication information can be outputted in various ways including text, image, icon, speech and the like.

In this case, a key zone (UNLOCK) 1601 for receiving an input of a viewing restriction release command signal, which will be described later, a key zone (END) 1602 for receiving a selection of a broadcast mode end, and a key zone (other contents) 1603 for receiving a selection of a shift to another broadcast service providing different broadcast contents.

For instance, if the key zone 1601 is selected, the mobile terminal 100 is able to perform a viewing restriction release operation, which will be described later, on the viewing restricted broadcast content. If the key zone 1602 is selected, the mobile terminal 100 is able to switch to another broadcast service.

Referring to FIG. 16B, in case that the reference rating value is changed due to the adjustment of the specific field value, the mobile terminal 100 enables a user to select an applicable range of the changed reference rating value.

For instance, if 'current broadcast content' is selected, the changed reference rating value is applied to a currently display stopped broadcast content only. If 'current channel (or a current service)' is selected, the changed reference rating value is only applied to a broadcast service that provides the currently display stopped broadcast content. If 'apply periodically' is selected, the changed reference rating value is applied with periodicity corresponding to the current broadcast content. If 'apply all' is selected, the changed reference rating value can be applied to all broadcast contents in the future.

In particular, referring to FIG. 16B, if 'apply periodically' is selected in FIG. 16A, if the currently display stopped broadcast content is periodically broadcasted, the mobile terminal 100 is able to periodically apply the changed reference rating value to correspond to a broadcast periodicity of the broadcast content or is able to periodically apply the changed reference rating value only for a broadcast hour of the currently display stopped broadcast content in a day.

In the following description, the second case is explained.

First of all, if the content rating value fails to met the reference rating value, under the control of the controller 180, the mobile terminal outputs an information (hereinafter named a non-displayable indication information), which indicates that the received broadcast content is not displayable, via the display module 151 under the control of the controller 180 [S241].

In this case, if the content rating value fails to meet the reference rating value, it can mean that the mobile terminal 100 fails to retain a viewing authority of a broadcast content on which the content rating value is set. So to speak, it can mean that a viewing restriction is set on the received broadcast content.

For instance, it is able to output the non-displayable indication information in various ways including text, image, icon, emoticon, flash, speech and the like.

In the course of performing the outputting step S241, the mobile terminal receives an input of a viewing restriction release command signal for the viewing restriction set broadcast content via the user input unit 130 [S242].

In this case, the viewing restriction release command signal can include the signal for releasing the viewing restriction set broadcast content from the viewing restriction by adjusting the reference rating value to be met by the content rating value. For instance, the viewing restriction release command signal can be named an unlock command signal.

Moreover, in the course of performing the outputting step S241, the mobile terminal 100 is able to display a key zone for receiving an input of the viewing restriction release command signal on a prescribed region of the screen. If the displayed key zone is selected, the mobile terminal 100 is able to receive an input of the viewing restriction release command signal.

In case of relieving the viewing restriction release command signal [cf. S242], the mobile terminal 100 receives an input of an authentication information for authentication a viewing restriction release authority from a user under the control of the controller 180. If the inputted authentication information is valid, the mobile terminal 100 authorizes the viewing restriction release authority under the control of the controller 180 [S243].

For instance, if the inputted authentication information matches a previously registered authentication information, the mobile terminal 100 is able to determine that the inputted authentication information is valid.

The authentication information inputting process can be regarded as a procedure required for canceling the viewing restriction in general but is optional. Hence, the authentication information inputting process can be omitted from the embodiment of the present invention if necessary.

If the viewing restriction release authority is authenticated in the authenticating step S243, under the control of the controller 180, the mobile terminal 100 outputs the information on a plurality of the field values configuring the content rating value and the information on a plurality of the field values configuring the reference rating value [S244]. In this case, it is able to display the information on the field values using the display module 151.

The outputting step S244 shall refer to the description of the former outputting step S233.

A user checks the outputted informations and is then able to determine which field value of the reference rating value should be adjusted to release the currently display reserved broadcast content from the viewing restriction or how much the adjustment extent should be set for the adjustment target field.

In the following description, the inputting step S242, the authenticating step S243 and the outputting step S244 are explained with reference to FIGS. 17A to 17E.

FIGS. 17A to 17E are diagrams of screen configurations for a case that a viewing restriction release command signal according to the present invention.

Figure 17A:
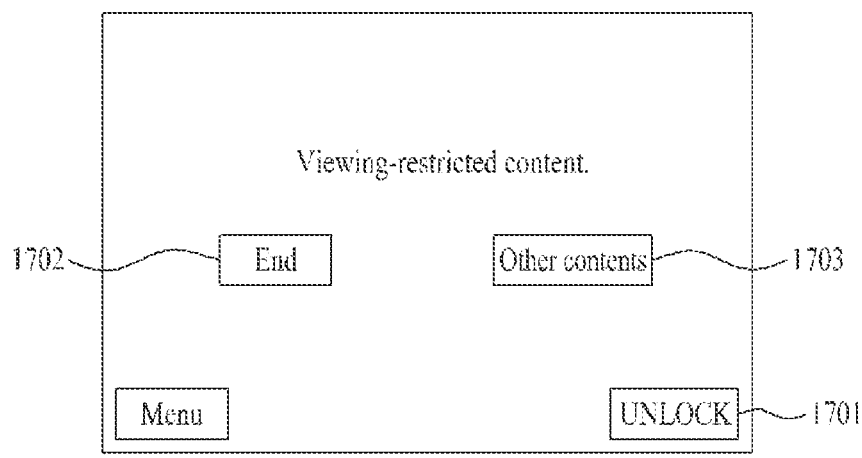
FIGS. 17A to 17E are diagrams of screen configurations for a case that a viewing restriction release command signal according to the present invention.

Referring to FIG. 17A, a key zone (UNLOCK) 1701 for receiving a viewing restriction release command signal is provided to the mobile terminal 100 in a manner of being displayed on a prescribed region of a screen for outputting a non-displayable indication information. If the key zone 1701 is selected by a user, the mobile terminal 100 is able to receive an input of the viewing restriction release command signal.

Alternatively, the viewing restriction release command signal can be inputted in various ways including a selection of a corresponding menu item, a selection of a corresponding key, a detection of a corresponding motion (e.g., shaking, etc.), an input of a corresponding speech and the like.

Figure 17B:
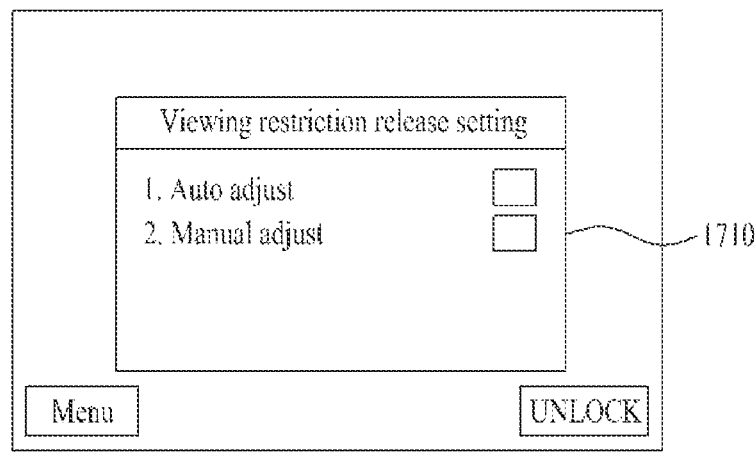

Referring to FIG. 17B, in case of receiving an input of a viewing restriction release command signal, the mobile terminal 100 is able to display a window 1710 for enabling a user to select whether to adjust a reference rating value manually or automatically on a screen. In this case, the auto adjustment and the manual adjustment can refer to the former description with reference to FIG. 11B.

Figure 17C:
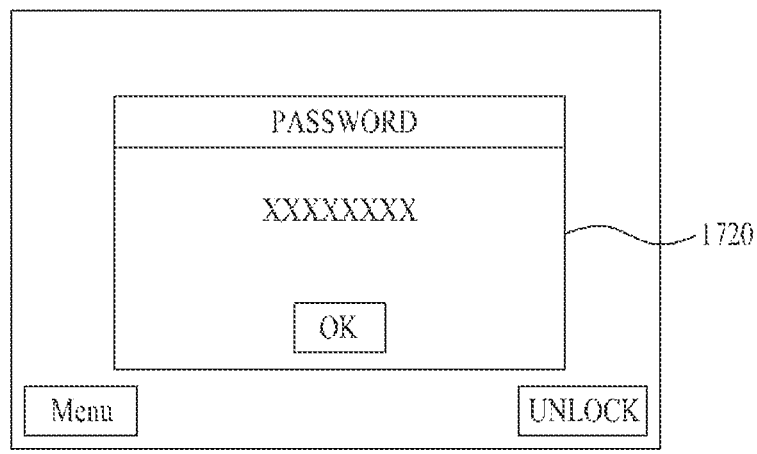

Referring to FIG. 17C, the mobile terminal 100 displays a window 1720 for receiving an input of an authentication information and is then able to display the authentication information inputted by the user on the window 1720. If the inputted authentication information is valid, the mobile terminal 100 authenticates a viewing restriction release authority and is the able to proceed to the next step (e.g., a reference rating value adjusting step).

Figure 17D:
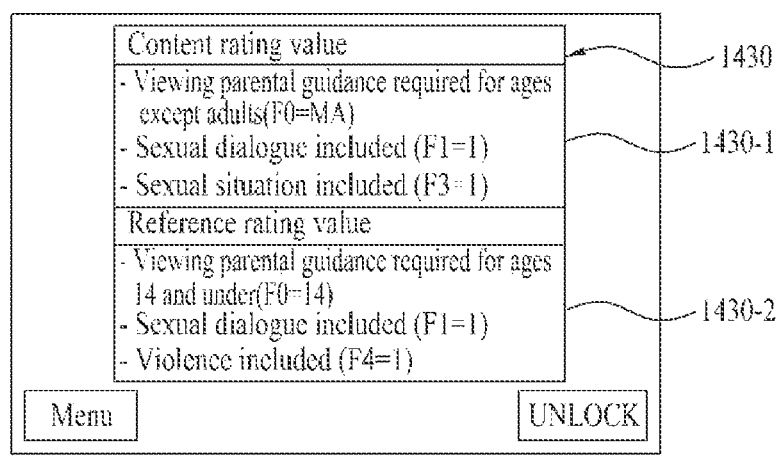
Figure 17E:
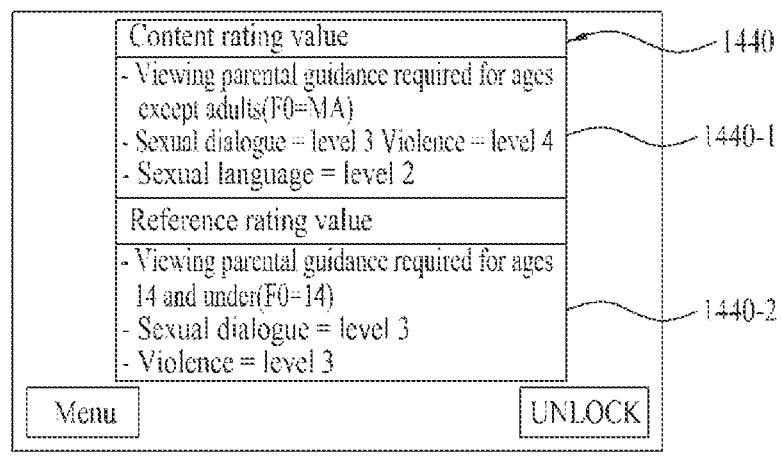

Referring to FIG. 17D and FIG. 17E, in case of receiving an input of a viewing restriction release command signal, the mobile terminal 100 is able to display a window 1730 including an information 1730-1 on a plurality of field values configuring a content rating value and an information 1730-2 on a plurality of field values configuring a reference rating value or a window 1740 including an information 1740-1 on a plurality of field values configuring a content rating value and an information 1740-2 on a plurality of field values configuring a reference rating value.

In this case, the information on the content rating value and the information on the reference rating value in FIG. 17D follow the field value configuration shown in FIG. 10B (a). And, the information on the content rating value and the information on the reference rating value in FIG. 17E follow the field value configuration shown in FIG. 10B (b).

Referring now to FIG. 2, in case of receiving the input of the viewing restriction release command signal [cf. S242], under the control of the controller 180, the mobile terminal 100 adjusts a specific one of a plurality of the field values configuring the reference rating value using the information outputted in the outputting step S244 to enable the content rating value to meet the reference rating value [S245]. In this case, the specific field value can include at least one of a plurality of the field values configuring the reference rating value.

Moreover, in order to enable the content rating value to meet the reference rating value to the minimum [hereinafter named a minimum output possible condition], the controller 180 minimizes an adjustment extent of the adjustment target field.

In case of the auto adjustment, if there is at least one field, of which value has a restriction level equal to or lower than that of the content rating value in the adjusting step S245, the mobile terminal 100 is able to adjust the corresponding field value to have the restriction level set higher than that of the content rating value for all of the at least one or more fields.

In case of the manual adjustment, if there is at least one field, of which value has a restriction level equal to or lower than that of the content rating value in the adjusting step S245, the mobile terminal 100 is able to adjust the field value to have the restriction level corresponding to the adjustment extent inputted by the ser for each of the at least one or more fields.

Prior to the adjusting step S245, the mobile terminal 100 is able to display an information on a field-value adjustable field (e.g., a field set to a field value having a restriction level equal to or lower than that of the content rating value) adjustable to meet the minimum output possible condition and an information on an adjustment extent of the adjustable field.

In the following description, the adjusting step S245 is explained in detail with reference to FIGS. 18A to 19B. In the following description, a filed corresponding to a reference rating field is written as a field (reference), while a field corresponding to a content rating value corresponding to a content rating value is written as a field (content).

Figure 18A:
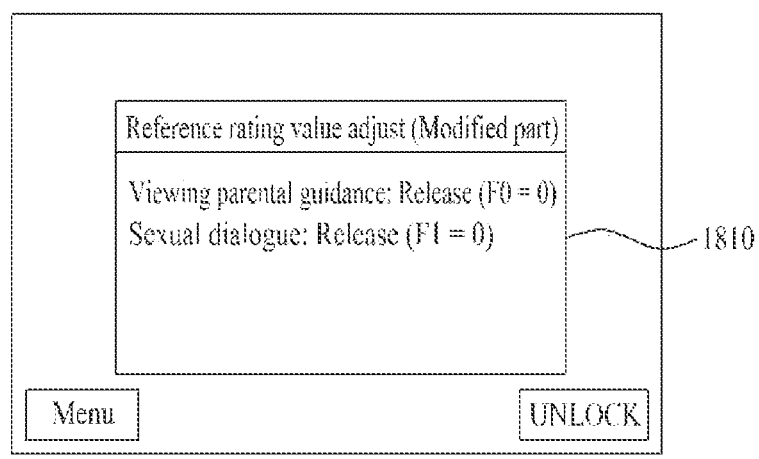

FIG. 18A to 18B are diagrams of screen configurations of a process for adjusting a reference rating value configured according to a first embodiment of the present invention. For clarity of the following description, assume that a content rating value and a reference rating value include the former field values shown in FIG. 10B (a).

Referring to FIG. 18A, under the control of the controller 180, since a field value of the first field (content) is set to MA (adults only, viewing parental guidance required) that is the highest restriction level, the mobile terminal 100 adjusts a field value of the first field (reference) into 'setting release (F0=0)' from "viewing parental guidance required for ages 14 and under (F0=14)'. Since a field value of the second field (content) is set to 1, the mobile terminal is able to adjust a field value of the second field (reference) into 'setting release (F1=0)' from 1. Therefore, the mobile terminal 100 is able to adjust the reference rating value to meet the content rating value by not setting the first and second fields (reference) to the restriction factors anymore.

As an information on the adjusted field value among a plurality of the field values included in the reference rating value, the mobile terminal 100 is able to output an information 1810 indicating the adjustment of the field value having a specific restriction factor.

Referring to FIG. 18B, under the control of the controller 180, if the mobile terminal 100 is unable to set field values of the first and second fields (reference), which are adjustable to meet the minimum output possible condition, to become higher than the restriction levels of the first and second fields (content), the mobile terminal 100 is able to adjust them into 'setting release' (field value=0).

And, the mobile terminal 100 is able to output an information 1820 indicating how the field value of the first field 9 reference) is changed to have a prescribed restriction factor and an information 1830 indicating how the field value of the second field (reference) is changed to have a prescribed restriction factor.

Figure 19B:
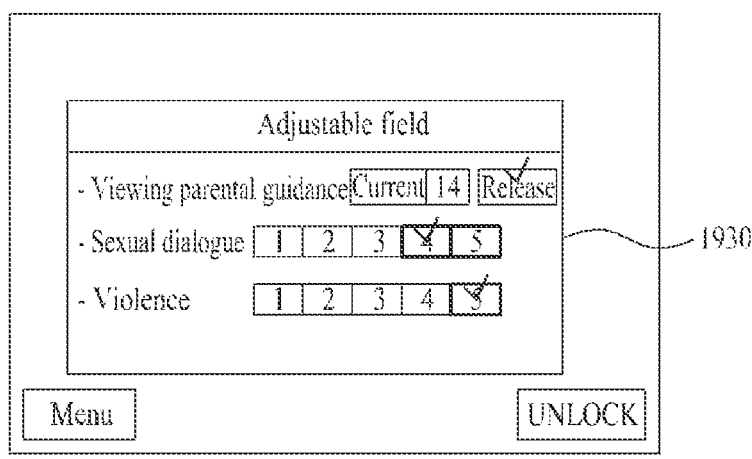

FIG. 19A and FIG. 19B are diagrams of screen configurations for automatically adjusting a reference rating value configured according to a second embodiment of the present invention in case of receiving an input of a viewing restriction release command signal. For clarity of the following description, assume that a content rating value and a reference rating value include the former field values shown in FIG. 10B (b).

Referring to FIG. 19A (a), under the control of the controller 180, since a field value of the first field (content) is set to MA (adults only, viewing parental guidance required) that is the highest restriction level, the mobile terminal 100 adjusts a field value of the first field (reference) into 'setting release (F0=0)' from "viewing parental guidance required for ages 14 and under (F0=14)'. Since a field value of the second field (content) is set to level 3, the mobile terminal 100 adjusts a field value of the second field (reference) into level 4 higher by 1 than the level 3. Since a field value of the fifth field (content) is level 4, the mobile terminal 100 adjusts a field value of the fifth field (reference) into level 5 higher by 1 than the level 4. As mentioned in the above description, by adjusting the field values of the first, second and fifth fields (reference), the mobile terminal 100 enables the content rating value to meet the reference rating value.

As an information on the adjusted field value among a plurality of the field values included in the reference rating value, the mobile terminal 100 is able to output an information 1910 indicating how the restriction level is changed.

Specifically, FIG. 19A (b) shows that the adjustment extent can vary according to a priority set for each of the adjustment target fields including the first, second and fifth fields. For instance, if a field has a higher priority, a field value can be set to have a bigger difference of a restriction level from the corresponding field (content).

Referring to FIG. 19B, the mobile terminal 100 displays a restriction factor per field and a currently set restriction level as an information 1930 on the fields (i.e., first field, second field and fifth field), of which field values are adjustable to meet the minimum output possible condition, and is then able to receive a selection of a restriction level (or adjustment extent) on each of the adjustable fields from a user. In this case, a restriction level selectable to meet the minimum output possible condition can be identifiably displayed.

Referring now to FIG. 2, in case of adjusting the specific field value of the reference rating value to enable to content rating value to meet the reference rating value in the adjusting step S245, the mobile terminal 100 releases the display-reserved broadcast content from the viewing restriction and then displays the corresponding broadcast content under the control of the controller 180 [S246].

Moreover, under the control of the controller 180, the mobile terminal 100 is able to apply the reference rating value, of which specific field value was adjusted in the adjusting step S245, to the corresponding broadcast content only. The former embodiment shown in FIG. 16B relating to the viewing restriction setting is applicable to the viewing restriction release or cancellation.

In the following description, a method of controlling a broadcast content display using a broadcast content list is explained with reference to FIGS. 20 to 22D.

Figure 20:
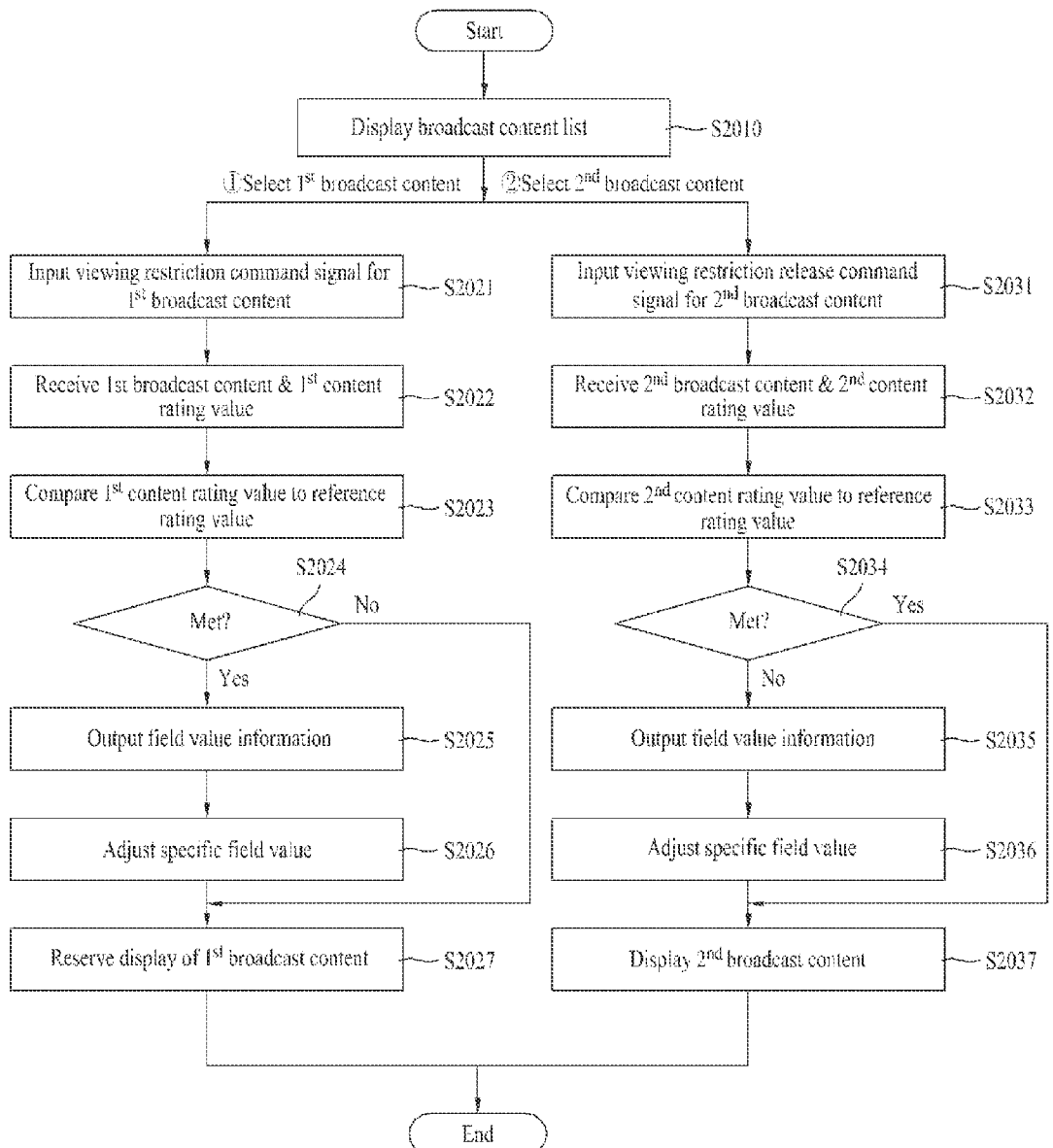
FIG. 20 is a second flowchart of a method of controlling a broadcast content output in a mobile terminal according to one embodiment of the present invention.

FIG. 20 is a second flowchart of a method of controlling a broadcast content output in a mobile terminal according to one embodiment of the present invention.

For clarity of the following description, assume that a first broadcast content and a second broadcast content are included in a broadcast content list. Moreover, a content rating value set for the first broadcast content is written as a first content rating value and a content rating value set for the second broadcast content is written as a second content rating value.

Referring to FIG. 20, the mobile terminal displays a broadcast content list via the display module 151 under the control of the controller 180 [S2010].

In doing so, the broadcast content list can be provided per broadcast service or ensemble. And, the broadcast content list can be one example of broadcast organization information.

In particular, the displaying step S2010 can be performed if a menu item, a key zone or a key corresponding to a display command for displaying the broadcast content list is selected or a speech or motion input corresponding to the display command for displaying the broadcast content list is detected.

The mobile terminal 100 receives an input of a viewing restriction command signal for the first broadcast content [S2021] and an input of a viewing restriction release command signal for the second broadcast content [S2031]. In doing so, the inputting step S2021/S2031 can be performed via the user input unit 130.

In particular, in case of receiving the input of the viewing restriction release command signal, the mobile terminal 100 is able to make a request for inputting an authentication information to a user to authenticate a viewing restriction release authority.

Once the viewing restriction command signal for the first broadcast content and the viewing restriction release command signal for the second broadcast content are inputted, the controller 180 makes a reservation for a viewing restriction setting on the first broadcast content and also makes a reservation for a viewing restriction release or cancellation for the second broadcast content.

Instead of setting the viewing restriction and the viewing restriction release on the first broadcast content and the second broadcast content at a current timing point, respectively, this can mean that the settings are reserved at the reception start timing points of the first and second broadcast contents or at prescribed timing points within predetermined times from the reception start timing points, respectively.

This is explained in detail with reference to FIGS. 21A to 21C as follows.

FIGS. 21A to 21C are diagrams of screen configurations for setting a viewing restriction or a viewing restriction release for a broadcast content using a broadcast content list according to the present invention.

Referring to FIG. 21A, a broadcast content list include a plurality of broadcast contents.

Referring to FIG. 21B, if a random broadcast content (e.g., a fourth broadcast content 2101, a fifth broadcast content 2102, etc.) is selected from the broadcast content list shown in FIG. 21A, the mobile terminal 100 is able to display a window 2110 including menu items settable for the selected broadcast content.

For instance, the settable menu items can include a viewing reservation, a recording reservation, a viewing restriction setting, a viewing restriction release setting and the like.

Referring to FIG. 21C, if the menu item of the viewing restriction setting on the fourth broadcast content 2101 is selected in FIG. 21B, the mobile terminal 100 makes a reservation of the viewing restriction setting on the fourth broadcast content 2101. If the menu item of the viewing restriction release setting on the fifth broadcast content 2102 is selected in FIG. 21B, the mobile terminal 100 is also able to make a reservation of the viewing restriction release setting on the fifth broadcast content 2102.

In doing so, on the broadcast content list, the viewing restriction setting reservation is displayed as an icon (L) 2121 and the viewing restriction release setting reservation is displayed as an icon (UL) 2122.

Referring now to FIG. 20, under the control of the controller 180, in case of receiving the first broadcast content and the first content rating value using the wireless communication unit 110 [S2022], the mobile terminal 100 compares the first content rating value to a reference rating value [S2023]. Under the control of the controller 180, in case of receiving the second broadcast content and the second content rating value using the wireless communication unit 110 [S2032], the mobile terminal 100 compares the second content rating value to the reference rating value [S2033].

The comparing steps S2023 and S2033 shall refer to the description of the former comparing step S220 shown in FIG. 2.

Meanwhile, since the mobile terminal 100 can be previously aware of a broadcast start hour of the first or second broadcast content using a broadcast service guide information and the like, if a broadcast mode is not entered yet before the broadcast start hour of the first or second broadcast content (or if the broadcast receiving module 111 is not activated), the mobile terminal 100 is able to enter the broadcast mode automatically at a timing point within a prescribed duration from a broadcast start timing point or the broadcast start hour. Alternatively, the mobile terminal 100 is able to enter the broadcast mode by having a user select whether to enter the broadcast mode. Thus, as the mobile terminal 100 has entered the broadcast mode, it is able to perform the receiving steps S2022 and S2032.

As a result of performing the comparing step S2023, if the first content rating value meets the reference rating value ['yes' in the step S2024], the mobile terminal 100 outputs information on a plurality of field values configuring the first content rating value and information on a plurality of field values configuring the reference rating value via the output unit 150 [S2025].

The outputting step S2025 shall refer to the description of the former outputting step S233 shown in FIG. 2. Since the outputting step S2025 is optional, it can be omitted.

Meanwhile, as a result of performing the comparing step S2023, if the first content rating value fails to meet the reference rating value ['no' in the step S2024], the mobile terminal 100 is able to directly set the viewing restriction on the first broadcast content without adjustment of the reference rating value under the control of the controller 180 [S2027].

In order to prevent the first content rating value from meeting the reference rating value, under the control of the controller 180, the mobile terminal 100 adjusts a specific one of a plurality of the field values included in the reference rating value [S2026]. In doing so, the adjusting step S2026 can use the field value information outputted in the outputting step S2025. In this case, the specific field value can include at least one of a plurality of the field values included in the reference rating value.

The adjusting step S2026 shall refer to the description of the former adjusting step S234 shown in FIG. 2.

In case that a specific field value of the reference rating value is adjusted not to meet the first content rating value in the adjusting step S2026, the mobile terminal 100 sets the viewing restriction on the first broadcast content and then reserves the display of the first broadcast content, under the control of the controller 180 [S2027].

In the following description, the adjusting step S2026 and the reserving step S2027 are explained with reference to FIG. 22A and FIG. 22B. For clarity of the following description, assume that the viewing restriction is set on the fourth broadcast content (broadcast hour: 13:30~15:00) [cf. FIG. 21C].

Figure 22A:
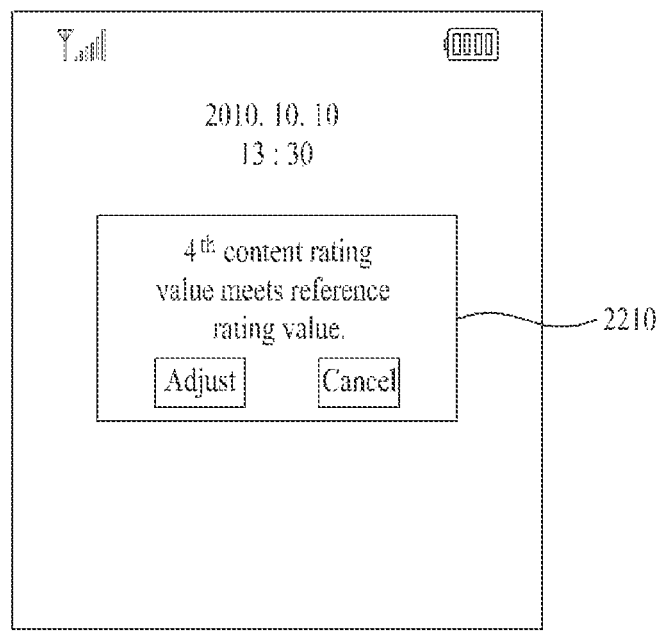
FIG. 22A and FIG. 22B are diagrams of screen configurations for reserving a broadcast output of a viewing-restricted broadcast content according to the present invention.
Figure 22B:
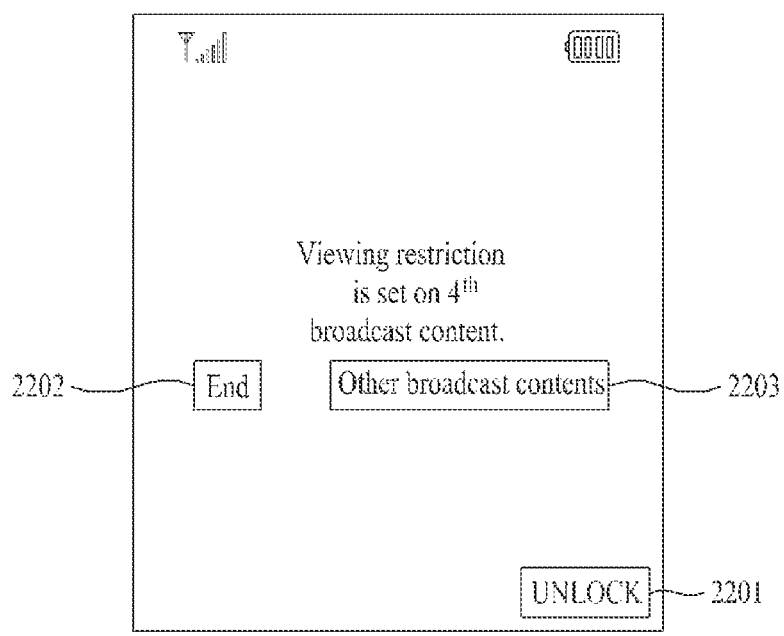

FIG. 22A and FIG. 22B are diagrams of screen configurations for reserving a broadcast output of a viewing-restricted broadcast content according to the present invention.

Referring to FIG. 22A, if the broadcast start hour 13:30 of the fourth broadcast content arrives, the mobile terminal 100 compares a content rating value of the fourth broadcast content to a reference rating value. As a result of the comparison, if the content rating value meets the reference rating value, the mobile terminal 100 enables a user to select whether to adjust the reference rating value.

Moreover, even if the content rating value meets the reference rating value during a period from the broadcast start hour to the viewing restriction setting according to the reference rating value adjustment, the controller 180 is able to reserve the display of the fourth broadcast content.

Referring to FIG. 22B, if a reference rating value adjustment (ADJUST) is selected in FIG. 22A, the mobile terminal 100 adjusts a specific field value of the reference rating value to prevent the content rating value from meeting the reference rating value. If the adjustment of the specific field value is completed, the mobile terminal 100 sets the viewing restriction on the fourth broadcast content and does not display the fourth broadcast content.

Moreover, as a result of performing the comparing step S2033, if the second content rating value fails to meet the reference rating value ['no' in the step S2034], the mobile terminal 100 outputs information on a plurality of field values configuring the second content rating value and information on a plurality of field values configuring the reference rating value via the output unit 150, under the control of the controller 180 [S2035].

The outputting step S2035 shall refer to the description of the former outputting step S233. Since the outputting step S2035 is optional, it can be occasionally omitted.

Meanwhile, as a result of performing the comparing step S2033, if the second content rating value meets the reference rating value ['yes' in the step S2034], the mobile terminal 100 is able to directly display the second broadcast content without performing the adjustment of the reference rating value [S2037].

The mobile terminal adjusts a specific one of a plurality of the field values included in the reference rating value to enable the second content rating value to meet the reference rating value under the control of the controller 180 [S2026]. In doing so, the information outputted in the outputting step S2035 can be used.

The adjusting step S2036 shall refer to the description of the former adjusting step S245 shown in FIG. 2.

If the specific field value is adjusted in the adjusting step S2036, the mobile terminal 100 displays the second broadcast content under the control of the controller 180 [S2037].

In the following description, the adjusting step S2036 and the displaying step S2037 are explained with reference to FIG. 22C and FIG. 22D. For clarity of the following description, assume that the viewing restriction is set on the fifth broadcast content (broadcast hour: 15:00~17:00) [cf. FIG. 21C].

Figure 22C:
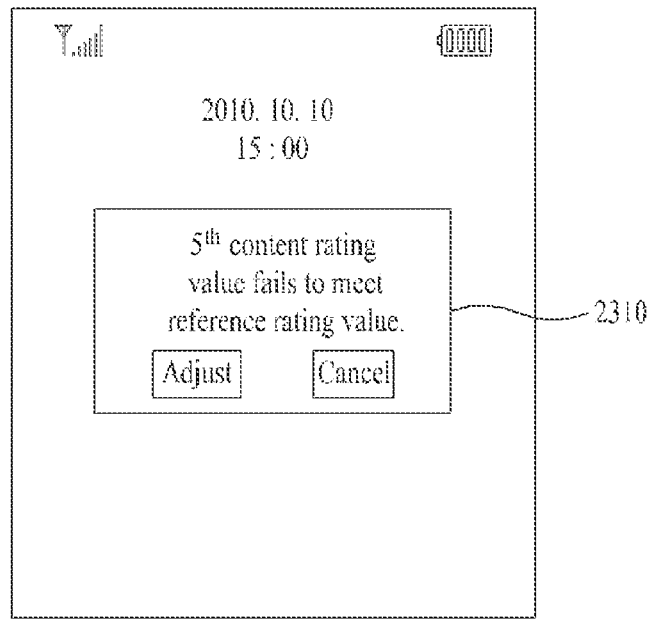
FIG. 22C and FIG. 22D are diagrams of screen configurations for outputting a broadcast of a viewing-unrestricted broadcast content according to the present invention.
Figure 22D:
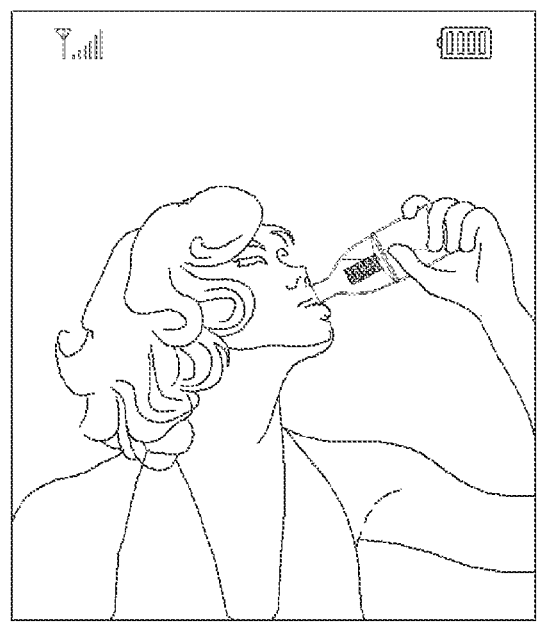

FIG. 22C and FIG. 22D are diagrams of screen configurations for outputting a broadcast of a viewing-unrestricted broadcast content according to the present invention.

Referring to FIG. 22C, if the broadcast start hour 15:00 of the fifth broadcast content arrives, the mobile terminal 100 compares a content rating value of the fifth broadcast content to a reference rating value. As a result of the comparison, if the content rating value fails to meet the reference rating value, the mobile terminal 100 enables a user to select whether to adjust the reference rating value.

Referring to FIG. 22D, if the reference rating value adjustment (ADJUST) is selected in FIG. 22C, the mobile terminal 100 adjusts a specific field value of the reference rating value to enable the content rating value to meet the reference rating value. If the specific field value adjustment is completed, the mobile terminal 100 is able to display the fifth broadcast content.

Meanwhile, the reference rating values including the specific field values adjusted in the adjusting steps S2026 and S2036 are just applicable to the first and second broadcast contents, respectively. If the broadcast of the corresponding broadcast content ends, the specific field value can return to the state previous to the adjustment. Of course, whether the specific field value returns to the previous state can be variously set according to a user selection. And, an applicable range of the changed reference rating value can be variously set according to a user selection as well [cf. FIG. 16B].

According to the present invention, in case that a reference rating value is adjusted by a different terminal, the mobile terminal 100 is able to receive an indication signal for indicating the reference rating value adjustment from the different terminal and is then able to control the reference rating value adjustment in the different terminal by wireless. For instance, if the mobile terminal 100 and the different terminal are a parent terminal and a child terminal, respectively, the present invention is useful.

According to the present invention, in case that a master terminal and a slave terminal are included in a plurality of terminals, a reference rating value set on a specific broadcast content in the master terminal is applicable to the slave terminal. For instance, if the salve terminal receives a broadcast content identical to a specific broadcast content, it can be aware that the received broadcast content is identical to the specific broadcast content using matching information (e.g., same identification information, etc.) on the specific broadcast content/Therefore, the slave terminal receives the set reference rating value from the master terminal and is then able to apply the received reference rating value to the broadcast content identical to the specific broadcast content.

According to one embodiment of the present invention, the above-described broadcast content display controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

Accordingly, the present invention provides the following effects and/or advantages.

First of all, in order to restrict t or allow a viewing of a broadcast content, the present invention adjusts at least one of a plurality of field values configuring a reference rating value, thereby facilitating the broadcast content viewing to be allowed or restricted.

Secondly, if a viewing restriction or a viewing restriction release is set on a specific broadcast content using a broadcast content list, the present invention adjusts at least one of a plurality of field values configuring a reference rating value, thereby controlling the broadcast content viewing to be allowed or restricted.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a wireless communication unit configured to receive a broadcast content and a content rating value set on the broadcast content;
   a memory configured to store a reference rating value for controlling a viewing restriction on the broadcast content;
   a display module configured to display the received broadcast content;
   a user input unit configured to receive an input of a viewing restriction command while the broadcast content is displayed via the display module; and
   a controller configured to:
   compare the received content rating value to the stored reference rating value;
   control the display module to display the received broadcast content when the received content rating value satisfies the reference rating value;
   control the display module to pause displaying of the broadcast content and to display the reference rating value comprising a plurality of adjustable field values in response to the viewing restriction command;
   adjust at least one of the plurality of field values in response to user input received via the user input unit such that the received content rating value does not satisfy an updated reference rating value comprising the adjusted at least one of the plurality of field values; and
   stop displaying the first broadcast content when the content rating value does not satisfy the updated reference rating value.

2. The mobile terminal of claim 1, wherein a plurality of fields corresponding to the plurality of the field values of the reference rating value define different restriction factors such that each of the plurality of fields enables a restriction level of a corresponding restriction factor to differ from restriction levels of other restriction factors.

3. The mobile terminal of claim 1, wherein the controller is further configured to compare a plurality of field values configuring the content rating value to the plurality of field values configuring the reference rating value by comparing each of corresponding field values of fields in the content rating value and the reference rating value that defines a same restriction factor.

4. The mobile terminal of claim 1, wherein the controller is further configured to control the display module to further display at least information on an adjustable field having a field value that is adjustable to prevent the content rating value from satisfying the reference rating value or information on an adjustment extent of the adjustable field.

5. The mobile terminal of claim 1, wherein the controller is further configured to control the display module to display a key zone for receiving the input of the viewing restriction command on a portion of a display screen when the received content is displayed.

6. The mobile terminal of claim 1, wherein:
   the user input unit is further configured to receive a selection action on at least one field of the reference rating value corresponding to the at least one of the plurality of field values to be adjusted; and
   the controller is further configured to adjust the at least one of the plurality of field values in response to the selection action such that the adjusted at least one of the plurality of field values has a restriction level that is equal to or lower than a restriction level of at least one field value of corresponding at least one field of the content rating value that defines a same restriction factor as the at least one field of the reference rating value.

7. The mobile terminal of claim 1, wherein:
   the user input unit is further configured to receive an input of an adjustment extent of the at least one field value to be adjusted; and
   the controller is further configured to adjust the at least one field value according to the received adjustment extent.

8. The mobile terminal of claim 1, wherein the controller is further configured to;
   determine whether at least one field among a plurality of fields of the reference rating value has a restriction level that is higher than a restriction level of at least one field of the content rating value; and adjust field values of all of the at least one field or a field value of a specific one of the at least one field such that an updated reference rating value including the adjusted field values or field value has an updated restriction level that is equal to or lower than the restriction level of the content rating value.

9. The mobile terminal of claim 1, wherein the controller is further configured to:
set a priority for each of a plurality of fields of the reference rating value; and
adjust field values of a predetermined number of fields among the plurality of the fields in order according to the set priority for each of the plurality of fields.

10. The mobile terminal of claim 1, wherein the controller is further configured to apply the updated reference rating value having the adjusted at least one field value only to the broadcast content currently received.

11. The mobile terminal of claim 1, wherein:
the wireless communication unit is further configured to receive a new broadcast content and a new content rating value set on the new broadcast content;
the controller is further configured to control the display module to display information indicating that the new broadcast content is not displayable when the new content rating value does not satisfy the reference rating value;
the user input unit is further configured to receive an input of a viewing restriction release command while the information is displayed; and
the controller is further configured to adjust at least one of the plurality of the field values included in the reference rating value in response to the viewing restriction release command such that the content rating value satisfies a new updated reference rating value including the adjusted at least one of the plurality of field values such that the display module displays the new broadcast content when the new content rating value satisfies the new updated reference rating value.

12. The mobile terminal of claim 11, wherein:
the user input unit is further configured to receive a selection action on at least one field corresponding to the at least one of the plurality of field values to be adjusted; and
the controller is further configured to adjust the at least one of the plurality of field values in response to the selection action such that the adjusted at least one of the plurality of field values has a restriction level that is higher than a restriction level of at least one field value of corresponding at least one field of the content rating value that defines a same restriction factor as the at least one of the plurality of fields of the reference rating value.

13. The mobile terminal of claim 11, wherein:
the user input unit is further configured to receive an input of an adjustment extent of the at least one field value to be adjusted; and
the controller is further configured to adjust the at least one field value according to the received adjustment extent.

14. The mobile terminal of claim 11, wherein the controller is further configured to:
determine whether at least one field among a plurality of fields of the reference rating value has a restriction level that is equal to or lower than a restriction level of the content rating value; and
adjust field values of all of the at least one field such that an updated reference rating value including the adjusted field values has an updated restriction level that is higher than the restriction level of the content rating value.

15. The mobile terminal of claim 1, wherein the controller is further configured to control the display module to display information on a plurality of field values configuring the content rating value in response to the viewing restriction command.

16. The mobile terminal of claim 1, wherein the controller is further configured to control the display module to display the reference rating value comprising the plurality of adjustable field values over the paused broadcast content such that the paused broadcast content is partially displayed when the reference rating value is displayed in response to the viewing restriction command.

17. A mobile terminal comprising:
a wireless communication unit configured to receive a broadcast content;
a display module configured to display a broadcast content list including a plurality of broadcast contents comprising a first broadcast content and a second broadcast content prior to receiving the first broadcast content and the second broadcast content;
a user input unit configured to receive an input of a viewing restriction command for the first broadcast content while the broadcast content list is displayed such that the viewing restriction command is associated with the first broadcast content in response to the input; and
a controller configured to:
compare a first content rating value set on the first broadcast content to a reference rating value set on the mobile terminal when the first broadcast content is received;
control the display module to display information on a plurality of field values configuring the first content rating value and information on a plurality of field values configuring the reference rating value when the viewing restriction command is associated with the first broadcast content and the first content rating value satisfies the reference rating value;
adjust at least first one of the plurality of field values included in the reference rating value when the first content rating value satisfies the reference rating value such that the adjusted at least first one of the plurality of field values causes the first content rating value to not satisfy an updated reference rating value including the adjusted at least first one of the plurality of field values; and
prevent the display module from displaying the first broadcast content when the first content rating value fails to satisfy the updated reference rating value.

18. The mobile terminal of claim 17, wherein a plurality of fields corresponding to the plurality of field values define different restriction factors such that each of the plurality of fields enables a restriction level of a corresponding restriction factor to differ from restriction levels of other restriction factors.

19. The mobile terminal of claim 17, wherein:
the user input unit is further configured to receive an input of a viewing restriction release command for the second broadcast content while the broadcast content list is displayed such that the viewing restriction release command is associated with the second broadcast content; and
the controller is further configured to:
compare a second content rating value set on the second broadcast content to the reference rating value when the second broadcast content is received;
adjust at least second one of the plurality of field values configuring the reference rating value when the second content rating value fails to satisfy the reference rating value such that the second content rating value satisfies an updated reference rating value including the adjusted at least second one of the plurality of field values; and control the display module to display the second broadcast content based on the updated reference rating value including the adjusted at least second one of the plurality of field values.

20. The mobile terminal of claim 17, wherein the controller is further configured to determine whether the first content rating value satisfies the reference rating value as a result of the comparison.

21. A method of controlling a broadcast content display in a mobile terminal, the method comprising:

comparing a content rating value set on a received broadcast content to a reference rating value set on the mobile terminal;

displaying the broadcast content when the content rating value satisfies the reference rating value;

receiving an input of a viewing restriction command while the broadcast content is displayed;

pausing the displayed broadcast content and displaying the reference rating value comprising a plurality of adjustable field values in response to the viewing restriction command;

adjusting at least one of the plurality of field values in response to user input such that the content rating value does not satisfy an updated reference rating value comprising the adjusted at least one of the plurality of field values; and stopping displaying of the first broadcast content when the content rating value does not satisfy the updated reference rating value.

22. The method of claim 21, further comprising:

receiving an input of a selection action on at least one field of the reference rating value corresponding to the at least one of the plurality of field values to be adjusted; and wherein adjusting the at least one of the plurality of field values comprises adjusting the at least one of the plurality of field values in response to the selection action such that the adjusted at least one of the plurality of field values has a restriction level that is equal to or lower than a restriction value of at least one field value of corresponding at least one field of the content rating value that defines a same restriction factor as the at least one field of the reference rating value.

23. The method of claim 21, further comprising:

receiving a new broadcast content and a new content rating value set on the new broadcast content;

displaying information indicating that the new broadcast content is not displayable when the new content rating value fails to satisfy the reference rating value;

receiving an input of a viewing restriction release command while the information is displayed;

adjusting at least one of the plurality of field values in response to the viewing restriction release command such that the content rating value satisfies a new updated reference rating value including the adjusted at least one of the plurality of field values; and displaying the new broadcast content when the new content rating value satisfies the new updated reference rating value.

24. The method of claim 21, further comprising:

further displaying information on a plurality of field values configuring the content rating value in response to the viewing restriction command.

25. A method of controlling a broadcast content display in a mobile terminal, the method comprising:

displaying a broadcast content list including a plurality of broadcast contents comprising a first broadcast content and a second broadcast content;

receiving an input of a viewing restriction command for the first broadcast content while the broadcast content list is displayed prior to receiving the first broadcast content such that the viewing restriction command is associated with the first broadcast content in response to the input;

receiving the first broadcast content and comparing a first content rating value set on the first broadcast content to a reference rating value set on the mobile terminal;

displaying information on a plurality of field values configuring the first content rating value and information on a plurality of field values configuring the reference rating value when the viewing restriction command is associated with the first broadcast content and the first content rating value satisfies the reference rating value;

adjusting at least first one of the plurality of field values included in the reference rating value when the first content rating value satisfies the reference rating value such that the adjusted at least first one of the plurality of field values causes the first content rating value to not satisfy an updated reference rating value including the adjusted at least first one of the plurality of field values; and preventing display of the first broadcast content when the first content rating value fails to satisfy the updated reference rating value.

26. The method of claim 25, further comprising:

receiving an input of a viewing restriction release command for the second broadcast content while the broadcast content list is displayed prior to receiving the second broadcast content such that the viewing restriction release command is associated with the second broadcast content;

receiving the second broadcast content and comparing a second content rating value set on the second broadcast content to the reference rating value;

adjusting at least second one of the plurality of field values when the second content rating value fails to satisfy the reference rating value such that the adjusted at least second one of the plurality of field values causes the second content rating value to satisfy an updated reference rating value including the adjusted at least second one of the plurality of field values; and displaying the second broadcast content when the second content rating value satisfies the updated reference rating value including the adjusted at least second one of the plurality of field values.

* * * * *